(12) United States Patent
Hurwitz

(10) Patent No.: US 8,418,654 B2
(45) Date of Patent: *Apr. 16, 2013

(54) DIRECT APPLICATION BRUSH HAVING FLOW REGULATOR ASSEMBLY

(75) Inventor: Marni Markell Hurwitz, Far Hills, NJ (US)

(73) Assignee: I Did It Inc., Far Hills, NJ (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/931,827

(22) Filed: Feb. 11, 2011

(65) Prior Publication Data

US 2011/0206445 A1 Aug. 25, 2011

Related U.S. Application Data

(63) Continuation-in-part of application No. 12/079,454, filed on Mar. 27, 2008, now Pat. No. 8,082,886, which is a continuation-in-part of application No. 11/788,666, filed on Apr. 20, 2007, now Pat. No. 7,814,917, which is a continuation-in-part of application No. 11/710,848, filed on Feb. 26, 2007, now Pat. No. 7,694,687, which is a continuation-in-part of application No. 11/349,638, filed on Feb. 8, 2006, now Pat. No. 7,322,364, which is a continuation-in-part of application No. 11/186,583, filed on Jul. 21, 2005, now Pat. No. 7,337,784.

(51) Int. Cl.
*A01K 13/00* (2006.01)

(52) U.S. Cl.
USPC ............ 119/603; 132/112; 119/664; 119/651

(58) Field of Classification Search .................. 119/603, 119/604, 651, 652, 664; 132/112
See application file for complete search history.

(56) References Cited

U.S. PATENT DOCUMENTS

| | | | |
|---|---|---|---|
| 4,244,076 A | 1/1981 | Meyer | 15/188 |
| 5,150,491 A | 9/1992 | Ikemoto | 15/1.52 |
| 5,261,426 A | 11/1993 | Kellett et al. | 132/108 |
| 5,626,099 A | 5/1997 | Staller et al. | 119/625 |
| 6,450,127 B2 | 9/2002 | Willinger et al. | 119/663 |
| 6,543,388 B2 | 4/2003 | Willinger et al. | 119/663 |
| 6,575,174 B2 | 6/2003 | Lee | 132/160 |

*Primary Examiner* — Monica Williams
(74) *Attorney, Agent, or Firm* — Ernest D. Buff; Ernest D. Bugg & Assoc. LLC; Margaret A. LaCroid

(57) ABSTRACT

A brush assembly simultaneously separately controllably releases a fluid and liquid solution directly onto a surface, such as a coat of an animal during grooming, or onto an inanimate surface such as an exterior surface of a land vehicle. The brush assembly includes a molded brush having a plurality of apertures for fluid delivery, preferably water, as well as a secondary aperture for delivery of a liquid solution, such as soap, shampoo, or other treatments. At least one base plate with grooming implementations, such as bristles or a sponge may be interchangeably attached to the brush base. An ergonomical handle is provided having a palm conforming top and finger indentation sides constructed to form an internal cavity. The ergonomical handle is ambidextrous in nature for interchangeable left and right handedness. A center cylinder is located within the ergonomical handle and includes a bladder which aligns with the mid portion of the brush base for fluid delivery from a flow regulator. A secondary cylinder is located within the internal cavity of the ergonomical handle and includes a secondary bladder which aligns with the secondary aperture of the brush base for liquid solution delivery in response to pressing a release button. A closure member is provided that can be moved to an open or closed configuration to release or prevent, respectively, dispensing of the liquid solution. The fluid and liquid solution are separately but contemporaneously delivered directly to the surface during grooming.

32 Claims, 17 Drawing Sheets

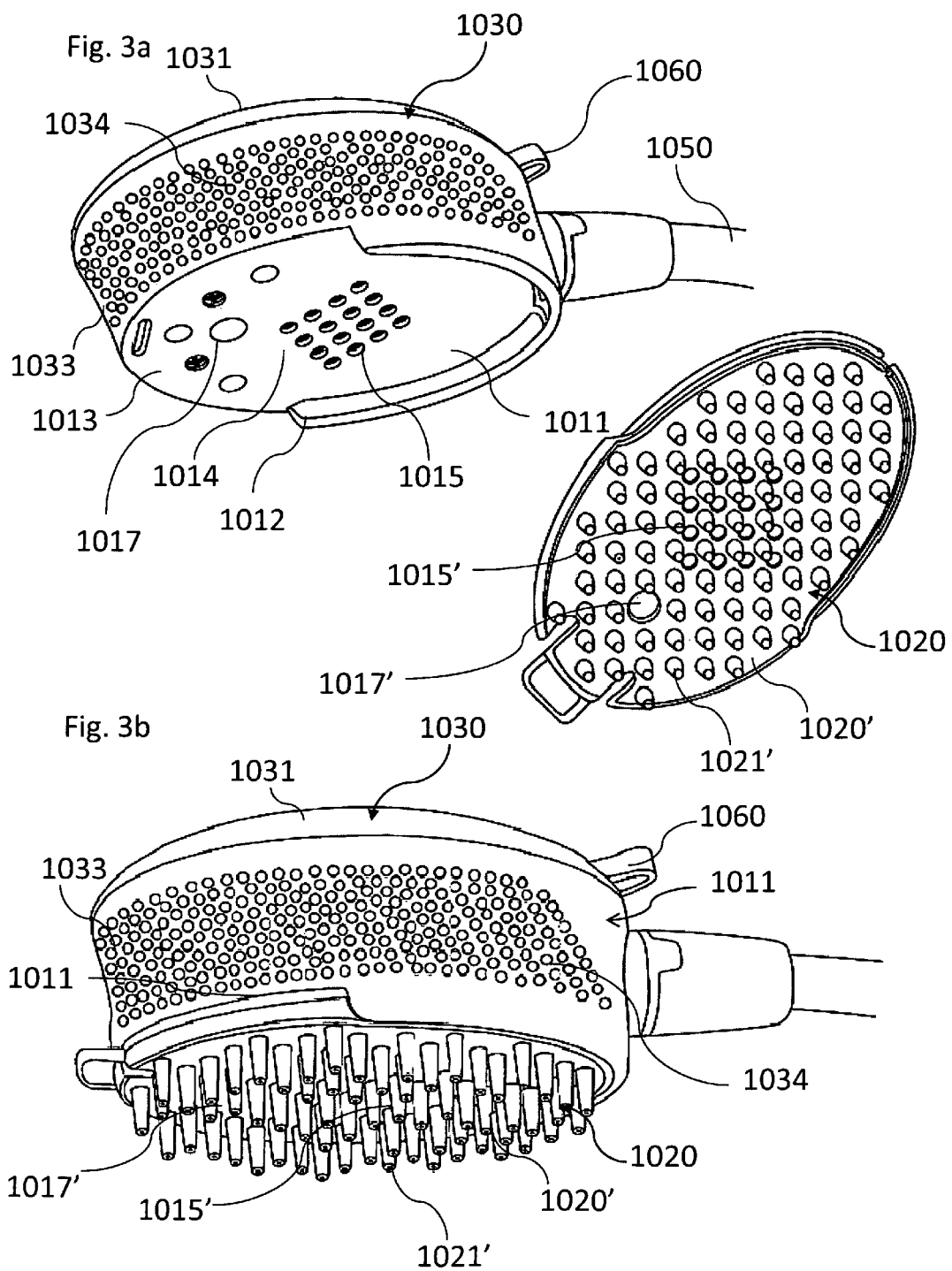

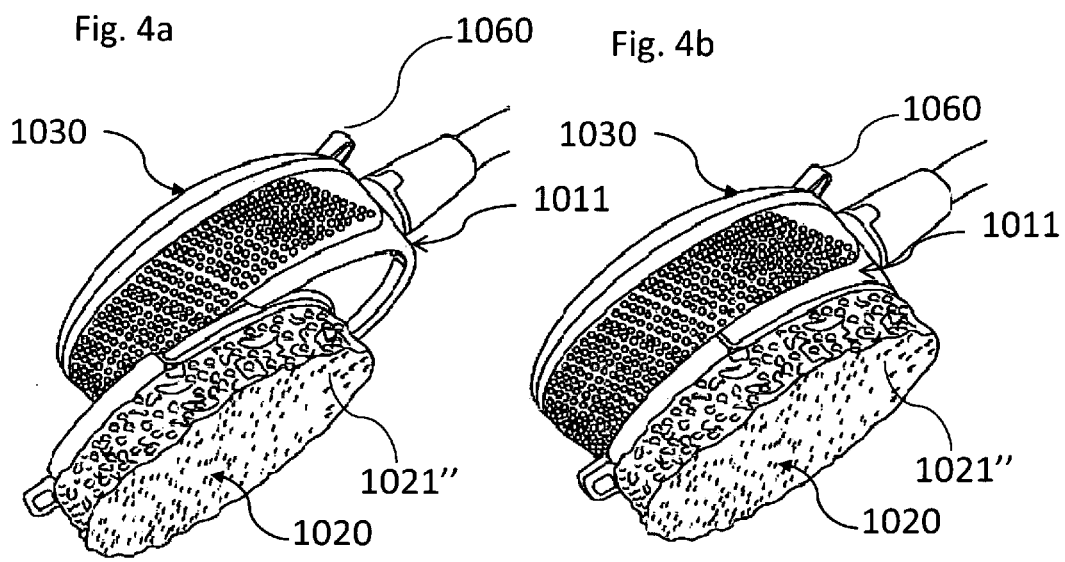

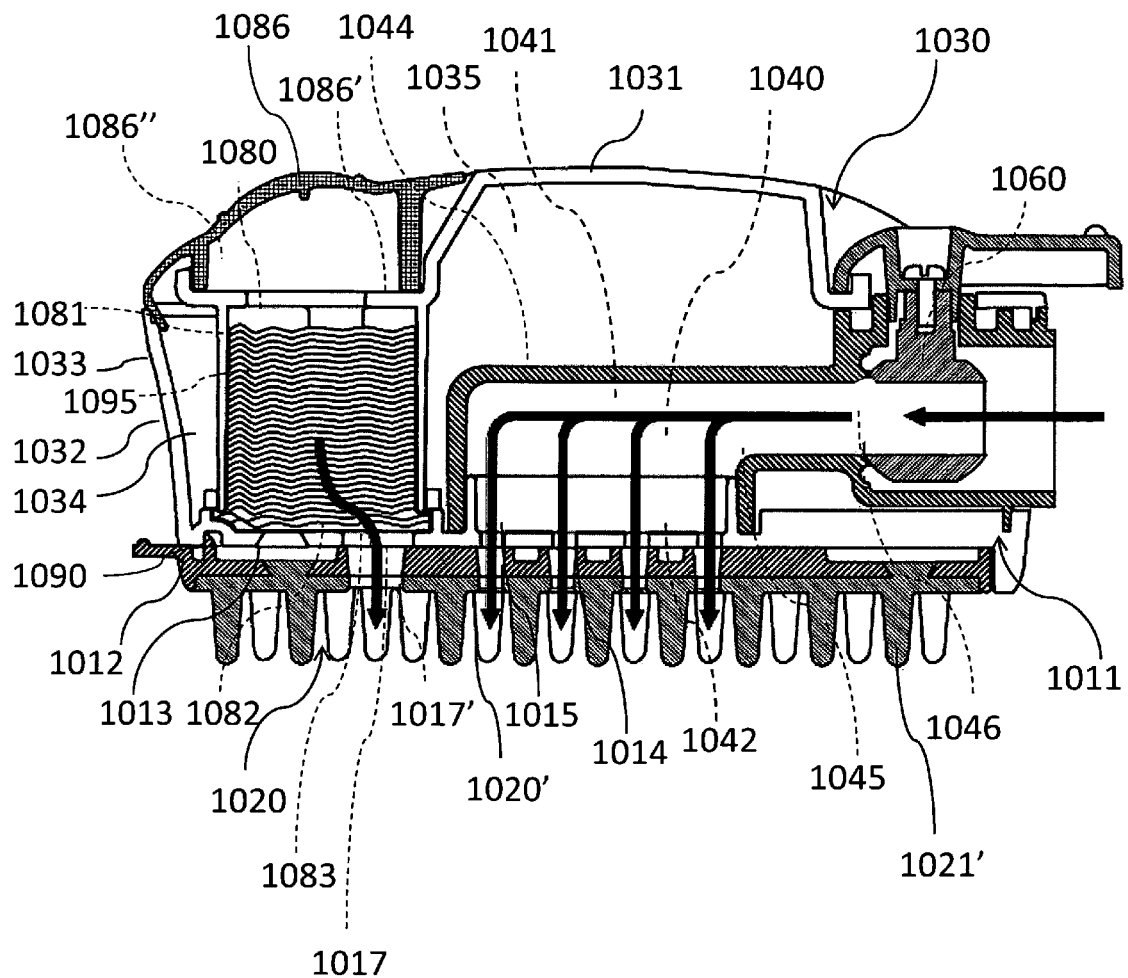

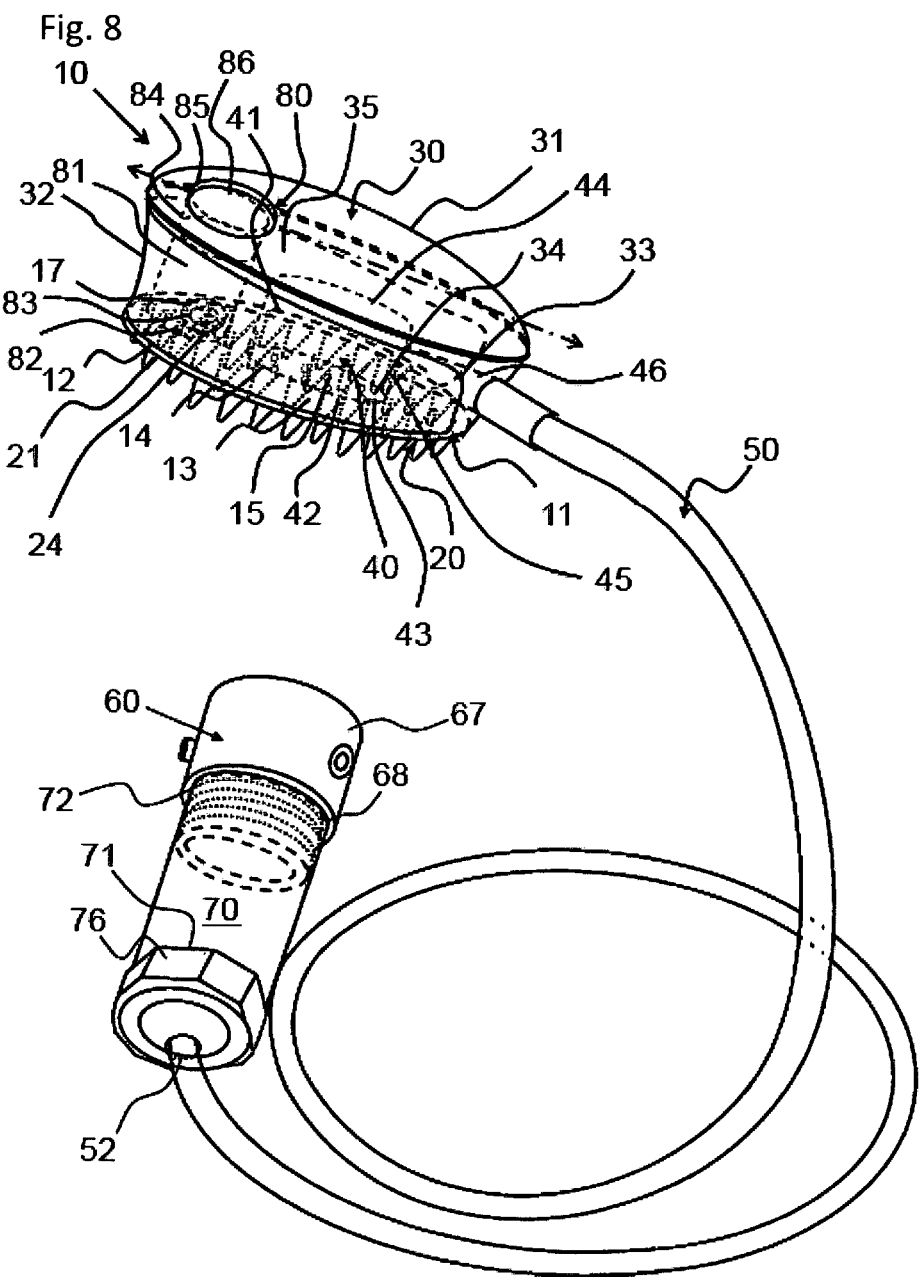

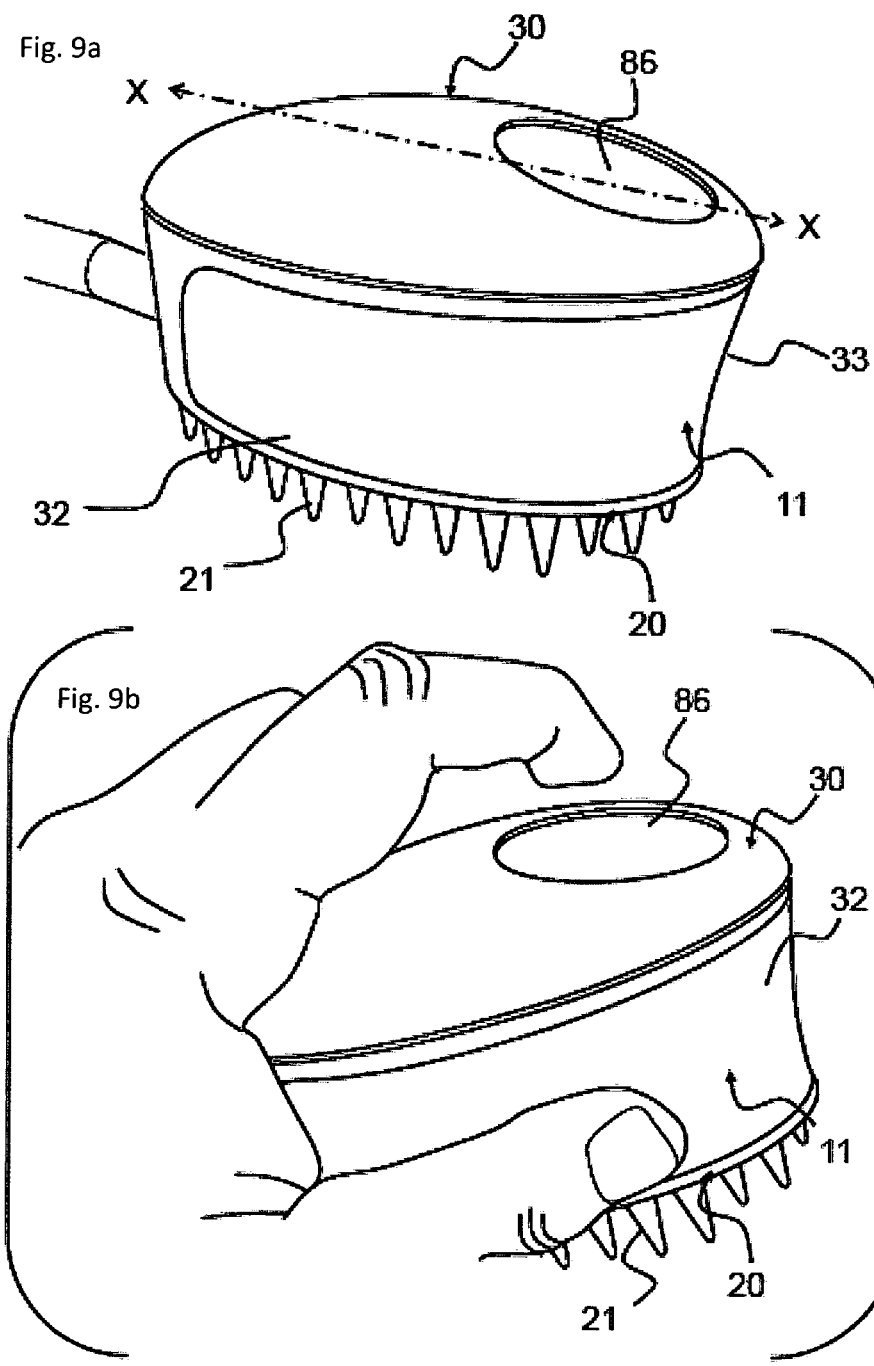

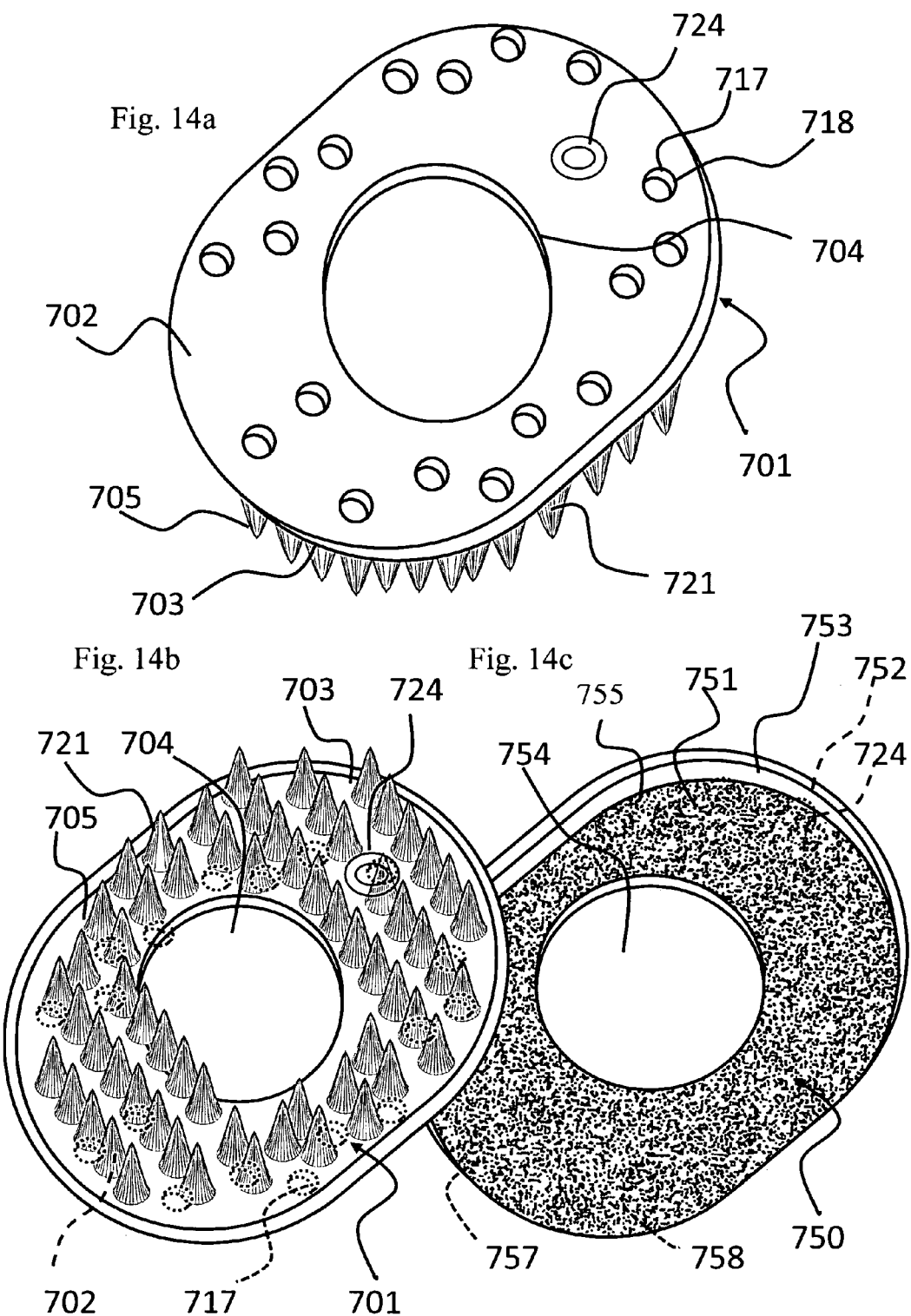

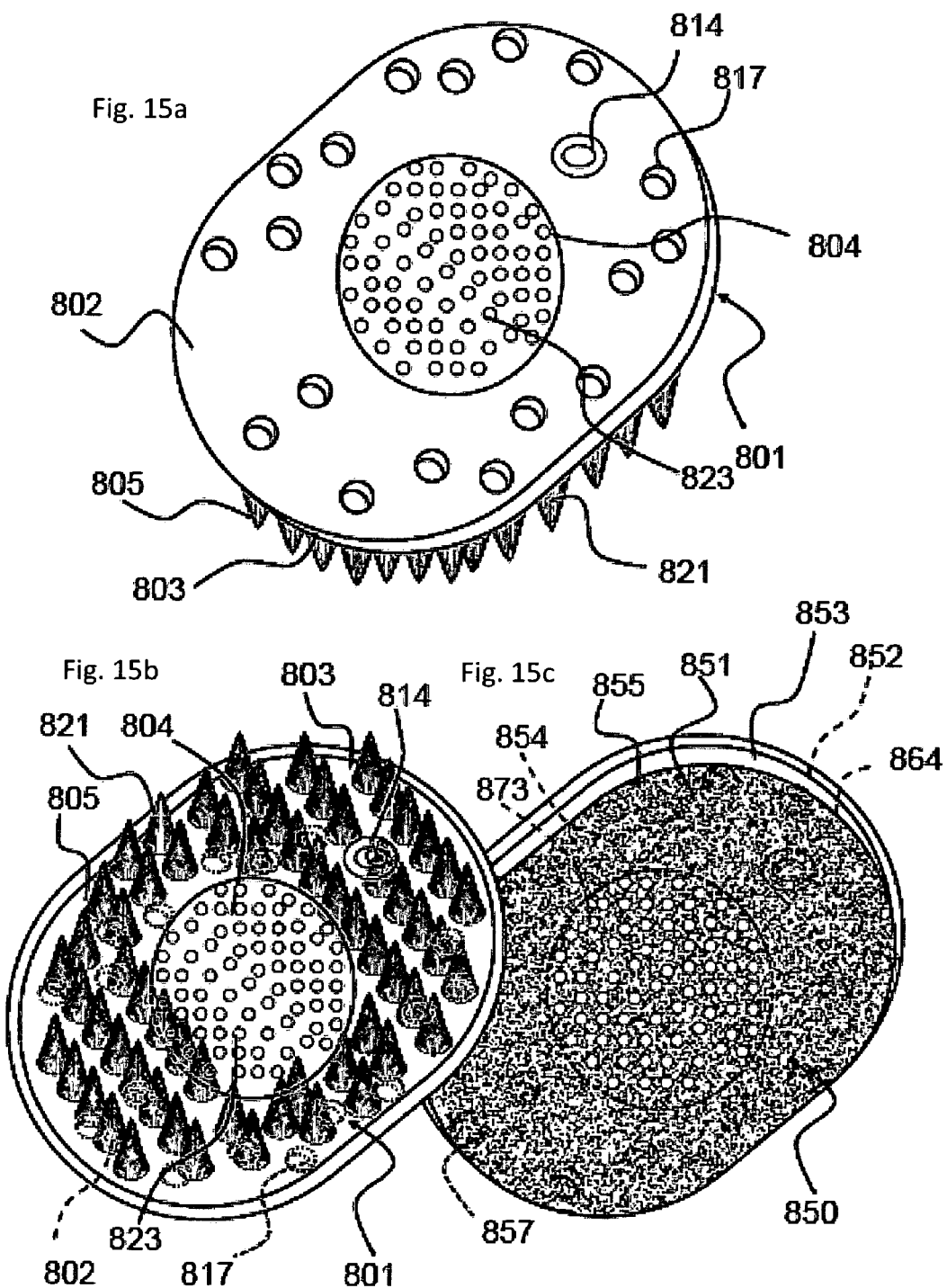

DIRECT APPLICATION BRUSH HAVING FLOW REGULATOR ASSEMBLY

CROSS-REFERENCE TO RELATED APPLICATIONS

This is a Continuation-In-Part of application Ser. No. 12/079,454, filed Mar. 27, 2008 now U.S. Pat. No. 8,082,886, for "Direct Application Brush with Sponge", which in turn is a Continuation-In-Part of application Ser. No. 11/788,666, filed Apr. 20, 2007 now U.S. Pat. No. 7,814,917, for "Add-on Hairbrush For Pets, People and Livestock That Releases Active Ingredients", which in turn is a Continuation-In-Part of application Ser. No. 11/710,848, filed Feb. 26, 2007 now U.S. Pat. No. 7,694,687, for "Direct Application Brush For Horses and Livestock That Releases Active Ingredients" which, in turn, is a Continuation-In-Part of application Ser. No. 11/349,638, filed Feb. 8, 2006 now U.S. Pat. No. 7,322,364, for "Hairbrush for Pets and People that Releases Active Ingredients", which, in turn, is a Continuation-In-Part of application Ser. No. 11/186,583, filed Jul. 21, 2005 now U.S. Pat. No. 7,337,784, for "Hairbrush for Pets and People that Releases Active Ingredients", the disclosures of which are hereby incorporated in their entirety by reference thereto.

BACKGROUND OF THE INVENTION

1. Field of the Invention

The present invention relates to a direct application brush assembly having a plethora of applications, including those involving pets, domesticated animals, horses and livestock for grooming, as well as washing inanimate objects, such as cars, or other items. The brush assembly is provided with a flow regulator and lightweight hose or tube for fluid delivery onto fur or hair or onto a surface to be cleaned or treated; and more specifically to a brush assembly which, during brushing or treatment, releases fluid fed through a hose or tube associated with a flow regulator through a first chamber and a liquid solution such as soap is appointed to be released from a second chamber, wherein the liquid solution includes active ingredients appointed to be delivered through the brush and released onto the surface, fur or hair. Active ingredients delivered through the liquid solution include therapeutic or moisturizing compounds, antibacterial compounds, medicaments, insect repellant, flea and/or tic compounds, hair-conditioning and detangle products, hair shampoo, soap, fragrances or other hair-related products for pets and people, sun protection lotions, mane and tail whiteners for animals, as well as stain removers, dye compositions, waxes or cleaning products for inanimate objects.

2. Description of the Prior Art

Many patents address issues related to brush designs having a number of bristles adapted to provide desired brushing action. Brushes for pets, horses and livestock typically incorporate harsh bristles, while those for humans are typically provided with softer bristles. Several patents disclose coating bristles with desired compositions in order to deliver these compositions to the brushed hair.

U.S. Pat. No. 4,244,076 to Meyer discloses a method and forming tool for the fabrication of a bristle support for a brush. The method involves attaching pin-like bristles to a bristle support or carrier for a hairbrush. In a first step the rows of bristle pins are interconnected with one another at their rear end by means of a web. The individual bristle pin rows are retained in their position by the web. In a next step the bristle pins, at the region of their rear ends, together with the webs, are cast in the material of the bristle support, so that the bristle pin rows are embedded in the bristle support. In this method, the bristle support or carrier is incapable of delivering perfume or other active compositions to the hair or fur being brushed.

U.S. Pat. No. 5,150,491 to Ikemoto discloses a hairbrush adapted to prevent static charging of the bristles and hair. It has a multiplicity of small holes formed in a conductive brush base that carries a row of antistatic members. The antistatic members are relatively stiff. They are prevented from bending down, and render the brush easy to draw through hair, thereby facilitating smooth brushing. The conductive brush base is solid. It cannot deliver perfume or other active compositions to hair or fur, but merely eliminates the static present in the hair and bristles by conducting charges that are present.

U.S. Pat. No. 5,261,426 to Kellett, et al. discloses a hydrophilic foam pad for hair styling. The hair conditioning and styling pad has a shaped body of a resilient, open-celled, hydrophilic polyurethane foam matrix integrally incorporating an aqueous phase incorporating about 70-90% water, about 5-25% of a hair conditioning agent, and a nonionic surfactant. The bristles or tines of a brush contact the resilient pad and transfer the aqueous hair styling composition to the brush so that the composition is subsequently transferred to the hair as it is being styled. This styling device requires periodic contact with the resilient pad to recharge the bristles, and does not by itself deliver perfume or other active compositions to hair or fur.

U.S. Pat. No. 5,626,099 to Staller, et al. discloses a therapeutic groomer. This hand-held grooming device grooms, massages, and provides magnetic therapy for animals. The device has a base that is configured to be hand-held. On the base, there is formed a grooming pad having projections adapted for grooming and massaging. The grooming pads are formed by either a plurality of parallely arranged strips, each having magnetic properties, or a single magnetic sheet. Each strip has its magnetic poles aligned uniformly so that its longitudinal ends are polar opposites. The therapeutic groomer does not deliver soap, shampoo, perfume or active compositions to the hair or fur being groomed.

U.S. Pat. Nos. 6,450,127 and 6,543,388 to Willinger, et al. disclose an ergonomic handle for a grooming brush. This brush handle is formed with a continuously arched upper surface portion and a lower surface portion separated by a humped semicircular ridge. One of the lower arched portions forms a trigger grip for a single finger held in either a forehand or backhand grip. The handle is covered with a high friction material in the form of a contoured rubber or elastomeric sleeve, which is stretched over a molded plastic handle. These patents relate only to the shape of a handle of a hairbrush and do not disclose a brush that delivers soap, shampoo, perfumes or other active ingredients to brushed hair or fur by way of flow regulation of fluid fed into a cavity within the brush.

A hairbrush commercially marketed by JW Pet Company (Hasbrouck Heights, N.J.) incorporates an ergonomic handle disclosed in U.S. Pat. Nos. 6,450,127 and 6,543,388. It uses a polymeric molded closed elliptical cavity which includes a thick elliptical rubber element carrying multitudes of metallic bristle pins with rounded tips. The distal end of the bristle pins opposed to the rounded tips carries nail heads, which rests against and are glued to a thick rubber element using rubber cement or similar glue. The bristle pins in the rubber element form an air leak-tight seal. The elliptical rubber element has a single hole appointed for discharging air. This elliptical rubber element with attached pins is squeezed into the closed elliptical cavity of a polymeric molded brush and the rubber element adopts a concave shape with the pins sticking out in a non-planar configuration. During use, pressure is applied to the pins in the middle portion of the elliptical rubber element of the brush. The air entrapped in the cavity formed by the rubber element and elliptical cavity is squeezed by the pressure applied, thereby providing a springy feel, while the entrapped air is released through the single hole present in the elliptical rubber element. This brush has a single air outlet and discharges air entrapped in the elliptical cavity of the brush. It has no means available for delivering soap, shampoo, perfume or other active ingredients to the brushed hair or fur.

U.S. Pat. No. 6,575,174 to Lee discloses a hair grooming brush having a plurality of rows of curved wavy bristles, rather than traditional straight bristles commonly found on brushes and combs. The curvature of the bristles produces springiness to the bristles when pressure is applied during the combing action. The springiness of the numerous rows of bristles translates into a massaging effect upon the hair and scalp. The brush does not include a brush base with a plurality of apertures for delivery of soap, shampoo, perfumes or other active compositions to the hair or fur being brushed.

A hairbrush commercially marketed under the trade name RapidBath® found at http://www.petproductadvisor.com/store/mc/rapid-bath 6.aspx?utm_source=dogcrazynews 001 et&utm_medium=email&utm_campaign=RapidBath6&utm_content=DC-20090924 discloses a containment device for receiving a shampoo solution which is connected to a hose. As water passes through the device is comes into contact with the shampoo and the shampoo and water are sprayed onto the pet. The RapidBath® does not have a water flow regulator and therefore the spray force cannot be controlled. Consequently, an anxious or nervous pet would instantly become upset or concerned when the water is sprayed from the device. Any attempt to utilize the device near the animal's face is thwarted due to the lack of pressure control exhibited by the device. Due to the resultant high velocity of the water pressure, the device could not be used on a small animal, such as a cat. Moreover, the RapidBath® device simply attaches to a hose and sprays water and shampoo solution onto the animal. The device does not include bristles and therefore is neither structured nor operates as a brush. As a result, the shampoo/conditioner/treatment will never penetrate through to the skin of the animal and will be vulnerable to leaving a layer of residue on the animal's coat. Because there are no bristles or appendages on the device, there is no massaging, no stimulating, and no real penetrating the skin layer at the follicle level of the coat.

There remains a need in the art for an easy to use brush assembly having application in cleaning/treating inanimate surfaces, such as cars, and/or for grooming people and animals, particularly domesticated pets and/or horses and livestock, that continuously delivers fluid directly to the surface of an inanimate object, or to an animal's hair, mane, and/or fur. Specifically, there is a need in the art for a brush assembly providing a brush base fitted with an interchangeable base plate, having a bladder attached to a flexible tube in communication with a flow regulator upstream for controlled fluid delivery through a centralized portion of the brush base. There remains a need in the art for a brush assembly that is further equipped with a secondary chamber adapted to hold a liquid solution containing active ingredients, including one or more active ingredients, such as shampoo, soap, conditioner, treatment containing a medicament, perfume or other active compositions, appointed for continuous delivery to the surface of an inanimate object, or to the hair, mane, and/or fur of animals, or to a hard substrate such as a land vehicle, marine craft or aircraft, household surfaces and the like. Additionally, there remains a need in the art for a brush assembly having an ergonomical handle containing a textured finger and palm grip so that the handle is ambidextrous in nature and can be used comfortably and interchangeably by left and/or right handed users.

SUMMARY OF THE INVENTION

The present invention discloses a lightweight brush assembly having a brush base engaged with a central cylinder having a fluid bladder that is appointed with a hose or lightweight tube and a flow regulator for controlled delivery of a fluid directly to a surface of an inanimate object, and/or to the scalp of a person, or the skin of an animal, or to the animal's fur, or the surface of a vehicle, marine craft, aircraft or household, such as a kitchen counter, door, exterior siding and the like. Moreover, a secondary cylinder is provided within the brush base that is appointed to receive and hold a liquid solution. The secondary cylinder comprises a secondary bladder with a lower surface having a lower orifice aligned with the secondary aperture of a perimeter shelf portion. A release button communicates with the lower orifice for controlled delivery of a liquid solution directly to an inanimate surface and/or an animal's fur. Preferably, the release button is pneumatic in nature, so that pressing of the button causes the secondary bladder to become pressurized and liquid dispensed therefrom. In order to prevent liquid from inadvertently escaping from the secondary bladder, a closure member is provided. The closure member is associated with the lower orifice of the second bladder and/or the secondary aperture of the perimeter shelf portion for preventing release of the liquid solution.

The brush base includes a mid portion having a plurality of apertures integrated therein. These apertures are aligned with a primary opening of a bladder housed within a center cylinder, which is disposed within an internal cavity of an ergonomical handle. A secondary aperture is integrated within the brush base, which in turn is aligned with the secondary cylinder for controlled, simultaneous separate delivery of the liquid solution. Use of the brush is not limited to animals, but may include people or inanimate objects, such as land vehicles, marine craft, aircraft, or other items.

The center cylinder includes a side wall having an orifice integrated therein for attachment to a hose for continuous fluid delivery. A flexible, deformable membrane having a plurality of apertures aligned with the apertures of the mid portion of the brush base may be integrated within the primary opening of the center cylinder, and/or a deformable membrane having a plurality of apertures may comprise the mid portion of the brush base. In turn, the interchangeable base plate may include bristles preferably protruding from a deformable membrane, which holds the bristles. The interchangeable base plate may be constructed with varying grooming tools, such as bristles, teeth, massaging protuberances, or a sponge or scrubber. Preferably, the interchangeable base plate simply snaps off from the brush base for replacement. Base plates including teeth or bristles may be provided for use in scrubbing or cleaning the scalp of an animal, while base plates having rounded protuberances/fingers (more rounded design) grooming implements may be used for less penetrating or massaging purposes. Sponge-like materials for softer applications may be integrated into another base plate for use on hard surfaces, or inanimate objects such as cars, trucks, boats, airplanes, household surfaces, such as countertops, doors, steps, exterior siding and the like. In another embodiment, teeth or bristles of the direct delivery brush are constructed to also deliver water, shampoo and mixtures thereof, or are used with the center cylinder for surface purposes only.

The primary opening of the center cylinder is aligned with the mid portion of the brush base so that a continuous liquid delivery path is provided though the plurality of apertures integrated within the mid portion of the brush base. The edges of the primary opening of the center cylinder are tightly fitted to or permanently bonded to the mid portion of the brush base, thereby forming a substantially leak-tight seal. The orifice of the center cylinder is fitted with a hose which is attached to a flow regulator so that the hose delivers a fluid from the flow regulator into the bladder of the center cylinder and through the apertures of the mid portion of the brush base onto the surface and/or animal's coat. As used herein the term "hose" is intended to mean a lightweight pvc braided tube-like conduit that can attach to a faucet or an outdoor hose of the conventional type.

The secondary cylinder is located within the internal cavity of the ergonomical handle and is appointed to receive and hold a liquid solution. The secondary cylinder is constructed with a secondary bladder having a lower surface. A lower orifice of the lower surface is aligned with the secondary aperture of the perimeter shelf portion. In addition, the secondary cylinder has side walls, and a top surface having a release button in communication with the lower orifice for release of the liquid solution. The closure member can be moved from opened and closed positions to allow for the release and/or prevent release, respectively, of the liquid from the secondary bladder. Preferably, the closure member is in communication with an external tab that can be moved or adjusted for opening and closing of the closure member. Further, preferably the closure member is shaped with an arced portion and stem wherein the arced portion traverses the body of the brush base to and fro in a sliding rotating fashion, moving the stem portion to and fro over the lower orifice of the secondary cylinder.

In operation, when the closure member is adjusted to the open/release position, the release button controls delivery of the liquid solution, releasing the liquid solution through the secondary aperture of the perimeter shelf portion of the brush base. This delivery is separately controlled from the delivery of the fluid (preferably water) through the plurality of apertures. While water is flowing from the plurality of apertures, a user can releasably control delivery of the liquid solution, which traverses through the secondary aperture of the brush base. Delivery of the liquid solution is separate and distinct from that of the fluid or water delivery, and is separately controlled. Contemporaneously, the water/fluid is controllably sprayed by way of the flow regulator, while at the same time depression of the release button controllably delivers the liquid solution through the separate secondary aperture and onto the animals coat. As a result, as the liquid solution is dispersed onto the coat, the groomer scrubs the grooming implementations or tools integrated within the brush base over the dispersed liquid solution so that water/fluid comingles with the liquid solution and foaming/or activation results. In this manner, not only can the amount of liquid solution delivery be controlled based on the animal's needs, but the mixing of the liquid solution and the water at the fur interface provides optimal delivery and penetration of the active ingredients in the liquid solution. Also, the separate delivery of the water/fluid and liquid solution allows the groomer to spray with just water in order to properly and efficiently remove all residue of the liquid solution from the fur or coat of the animal.

The liquid solution contains a desired liquid gel of perfume or fragrance or other active compositions such as insect repellants, hair-conditioning products, dye compositions, moisturizing ingredients, antibacterial compounds, and the like. When hair or fur is brushed with the brush of the subject invention, the flow regulator is turned on and adjusted according to the desired flow rate and water is released. At the same time, the liquid solution is controllably released based on the desired amount, and at the desired time interval. The liquid solution may contain soap, shampoo, conditioner, treatment, fragrance or perfume, an odor neutralizing agent, or other active compositions, and is released to the hairs or fur of the coat being brushed or sponged through the secondary aperture provided within the perimeter portion of the brush base transferring the fluid, solution, liquid, or gel with soap, shampoo, conditioner, treatment, perfume, fragrance or active ingredient to hair or fur of the coat during brushing or sponging treatment.

Optionally, a mixing chamber may be attached to the flow regulator, wherein the mixing chamber houses a solution with an active composition delivered from the flow regulator to form a supplemental liquid solution that is fed into the bladder of the center cylinder. The supplemental liquid solution is presented separately from the secondary cylinder's liquid solution and is appointed to be utilized primarily when the animal needs additional treatment. For example, the secondary cylinder may contain a liquid solution comprised of shampoo, while the mixing chamber may provide a supplemental liquid solution comprised of tick or flea repellant/medication or perfume. Supplemental liquid solution treatment is based upon the particular animal's needs.

The direct delivery brush has a lightweight construction and an ergonomic design. Advantages developed from the light-weight ergonomic design include better balance and improved control over interface between the brush head and the surface that it contacts. In addition, the lightweight construction and ergonomic design provides increased control over bristle flexibility while directly delivering solution and water to the animal's coat/or to the surface, depending on the application. Inasmuch as the water feed is centralized and the liquid solution is located in a small secondary cylinder within the brush base, the brush has ultra-light weight and is highly reliable in operation. The ergo-dynamic design of the handle construction yields a grip that it is ambidextrously comfortably designed for both a right handed as well as a left handed person. Side indentations are provided in the handle construction for placement of the thumb and fingers. Indentations are duplicated on both sides of the handle to improve ambidexterity thereof.

A cylinder having a bladder is used in the center of the brush for delivery of water, while a secondary cylinder having a secondary bladder is used at the perimeter of the brush for delivery of a liquid solution such as soap, shampoo, conditioner or other treatments. Interchangeable base plates may be provided that are appointed to be attached to the brush base for scrubbing, massaging and/or sponging the animal's fur or an inanimate surface such as a vehicle, boat, airplane, household surface as hereinabove described. A flow regulator for water pressure is utilized, which is attached upstream from or directly to the brush. The ergonomical handle is preferably textured for less slippage when being used. Preferably, the brush is composed of a polymeric material, polycarbonates, polypropylenes, and the like, through injection molding, for keeping the brush lightweight. As another addition to a textured top portion of the ergonomical handle, a padded gel-like material may also be included to enhance comfort to the palm of the hand during use of the brush. The pad surface may be a fast drying material such as a gel-like material or foam material to provide a cushioned top surface.

The brush construction of the present invention is, in essence, a three-in-one brush, which preferably has a "semiclamshell" ergonomical handle configuration that is durable, simple to assemble and provides support for an internal water compartment. Texture or frictional coatings may be applied to the handle to mitigate slippage while the brush is being used. Water is efficiently directed to the bladder of the center cylinder and fed through the apertures in the mid portion of the brush base. The integrated bladder provided within the brush facilitates water delivery therethrough while, at the same time, minimizing the amount of water inside the brush, keeping it light and easy to handle. The bladder/internal water compartment conforms to a standard water tube. The water faucet holes or plurality of apertures integrated within the mid portion of the brush base are centrally located in the bottom of the molded base, which facilitates distribution of the water evenly through the base to the surface/fur wherein the comb "teeth" on the interchangeable base plate manipulates the fur or hair.

The soft comb "teeth" are preferably over-molded directly onto the base plate to provide near perfect adhesion for serious scrubbing while protecting the inanimate surface/animal from being harmed. Bristles with fine apertures may be provided, which may be attached, in numerous ways, to a flexible deformable membrane to form the base plate. The liquid or gel-like substance such as shampoo, conditioner, treatment, whiteners, and perfume or fragrance or active ingredient has a contact angle sufficiently low, typically in the range of 1 to 30 degrees with respect to the bristle material, so that the liquid penetrates the fine apertures provided within the brush. If the contact angle is significantly larger, the penetration of the liquid gel within the apertures of the brush base is compromised. The bristles may be molded together by injection molding or similar processes with the deformable membrane, as a unitary body with the apertures in the flexible deformable membrane matching the central aperture in the brush.

The brush is assembled first by forming the component parts, including: (i) forming a brush base having an outer perimeter portion, perimeter shelf portion and a mid portion with a plurality of apertures integrated therein for delivery of a fluid; (ii) forming at least one base plate having grooming implementations integrated therein being received on the perimeter shelf portion of the molded brush base; (iii) forming a center cylinder comprising a bladder with a bottom surface having a primary opening, a top surface, and a side wall having an orifice; (iv) forming a secondary cylinder appointed for receiving and holding a liquid solution and comprising a secondary bladder with a lower surface having a lower orifice, side walls, and a top surface having a release button in communication with the lower orifice; and (iv) forming an ergonomical handle having a palm conforming top and finger indentation sides constructed to form an internal cavity, the ergonomical handle being ambidextrous in nature for interchangeable handedness.

In assembling, the primary opening of the center cylinder is aligned with the mid portion of the brush base and placed therein, while the lower orifice of said secondary cylinder is aligned with the secondary aperture of said perimeter shelf portion and placed therein. The ergonomical handle is attached to the outer perimeter portion of the brush base so that the center cylinder is located within the internal cavity. A second end of a hose is connected to the orifice of the side wall of the center cylinder, and a first end of the hose is connected to a flow regulator for delivery of the fluid into the bladder of the center cylinder. During application, the fluid is delivered to the bladder of the center cylinder and released through the apertures in the mid portion of the brush while the liquid solution can be separately controllably released from the secondary aperture for direct delivery.

Significant advantages are realized by practice of the present invention. The key features of the direct application brush assembly include, in combination, the features set forth below:

1) a brush base having an outer perimeter portion, a perimeter shelf portion and a mid portion with a plurality of apertures integrated therein for delivery of a fluid;

2) at least one base plate having grooming implementations integrated therein, and being received on the molded brush base;

3) the base plate optionally being interchangeable to suit varying grooming needs, and provide for cleaning of inanimate objects;

4) an ergonomical handle having a palm conforming top and symmetric finger indentation around front and side walls constructed to form an internal cavity and being attached to the outer perimeter portion of the brush base;

5) the ergonomical handle having an ambidextrous construction for interchangeable handedness so that it can comfortably be used by left and right handed users;

6) a center cylinder located within the internal cavity of the ergonomical handle and comprising a bladder with a bottom surface having a primary opening, a top surface, and a side wall having an orifice;

7) the primary opening of the center cylinder being adapted to align with the mid portion of the brush base for delivery of fluid therethrough;

8) a secondary cylinder appointed for receiving and holding a liquid solution and comprising a secondary bladder with a lower surface having a lower orifice, side walls, and a top surface having a release button in communication with said lower orifice;

9) said lower orifice of said secondary cylinder communicating with said secondary aperture of said perimeter shelf portion and placing it upon said brush base;

10) a closure member appointed to be moved to open position for the release of the liquid, or to a closed position for preventing liquid from being released;

11) the user may periodically replace the secondary cylinder with a replacement cartridge secondary cylinder when the liquid or gel-like solution, shampoo, soap, conditioner, treatment, perfume, fragrance and/or other active composition is exhausted;

12) optionally, the user may simply refill the secondary cylinder when the liquid solution, perfume, fragrance and/or other active composition is exhausted;

13) a second end of a hose connected to the orifice of the center cylinder, and a first end of the hose connected to a flow regulator for controlled delivery of a fluid/water into the bladder of the center cylinder and, consequently, the internal cavity of the brush base;

14) optionally, a mixing chamber containing a substantially water soluble compound having an active ingredient may be attached to the flow regulator so that as water travels through the flow regulator into the mixing chamber the compound is dissolved to form a supplemental liquid solution treatment; and 15) the user may periodically replace the optional mixing chamber with a fresh mixing chamber when the liquid or gel-like substance, such as shampoo, conditioner, treatment, perfume, fragrance and/or other active composition is exhausted;

whereby the user of the brush is provided with the capability to saturate the hairs or fur of a coat being brushed, or surface of an inanimate object, with water, and separately and controllably release a liquid solution such as a soap, shampoo, conditioner, treatment, whitener, perfume, fragrance and/or other active compositions including insect repellant, hair conditioning products, dye compositions, moisturizing ingredients, antibacterial compounds, and the like, directly onto the animal's fur or to the hair or scalp of a person.

BRIEF DESCRIPTION OF THE DRAWING

The invention will be more fully understood and further advantages will become apparent when reference is had to the following detailed description of the preferred embodiments of the invention and the accompanying drawings, in which:

FIG. 3a is a bottom view of the brush assembly wherein a base plate is being attached onto the brush base;

FIG. 3b is a bottom view of the brush assembly wherein the base plate having bristles is attached onto the brush base;

FIG. 4a is a bottom view of the brush assembly wherein a base plate having a sponge is being attached onto the brush base;

FIG. 4b is a bottom view of the brush assembly wherein the base plate is attached onto the brush base;

FIG. 5b shows a cut-away view of FIG. 2a taken at M-M, wherein liquid is loaded in the secondary bladder, the bladder is in the closed condition, and the closure member is in the open position—just before the release button is pressed/activated;

FIG. 8 is a schematic view of an embodiment of the brush assembly in the assembled conditions, showing the brush base, base plate, ergonomical handle, center cylinder for fluid/water delivery, secondary cylinder for liquid solution delivery, hose and flow regulator, which in turn is attached to the optional mixing chamber for supplemental liquid solution delivery;

FIG. 9a is a top view of the embodiment of the brush assembly of FIG. 8, shown in the assembled condition;

FIG. 9b is a bottom-side view of the embodiment of the brush assembly of FIG. 8, shown in the assembled condition shown in a user's hand;

FIG. 10 shows a cut-away view of FIG. 9a taken at X-X;

FIG. 11 illustrates the construction of the secondary cylinder appointed to receive and house the liquid solution, such as shampoo, soap, or the like;

FIG. 14a shows a bottom view of an embodiment of the base plate;

FIG. 14b shows a top view of the embodiment of FIG. 14a of the base plate;

FIG. 14c shows a top view of another embodiment the base plate shown in FIG. 14a;

FIG. 15a shows a bottom view of an embodiment of the base plate;

FIG. 15b shows a top view of the embodiment of FIG. 15a of the base plate; and

FIG. 15c shows a top view of another embodiment of the base plate shown in FIG. 15a.

DETAILED DESCRIPTION OF THE INVENTION

Figure 1:
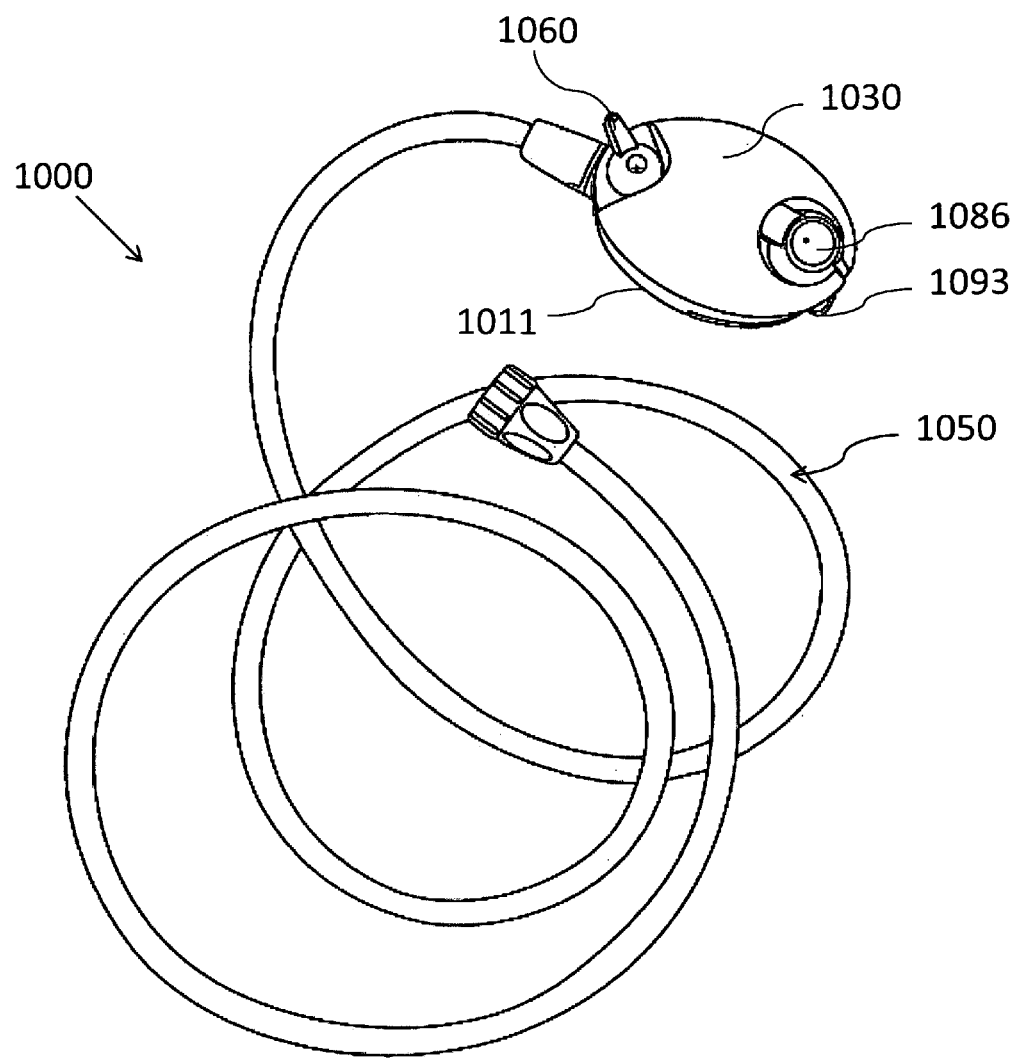
FIG. 1 is a top planer view of an embodiment of the brush assembly in the assembled condition, showing the brush base, ergonomical handle, hose and flow regulator.

This invention relates to a brush and flow regulator having a hose assembly, for use with animals such as domestic pets, horses and livestock, or inanimate objects, such as cars, boats, aircraft or other surfaces needing cleaning and/or treatment. The brush assembly of the subject invention releases fluid, such as water, and controls release of a solution containing active compounds in substantially liquid form onto the surface, fur, hair, mane, and/or coat of the animal, penetrating follicle depths. Fluid flow is controlled by the flow regulator, which feeds fluid into a hose/tube. Liquid is delivered from the hose into a bladder of a center cylinder located in an internal cavity of the brush. The bladder is associated with a brush base for release through apertures and onto the surface, fur or hair, hard surface, or the like. A secondary cylinder within the ergonomical handle receives and holds a liquid solution. The secondary cylinder comprises a secondary bladder with a lower surface having a lower orifice aligned with the secondary aperture of the perimeter shelf portion. In addition, the secondary cylinder comprises side walls, and a top surface having a release button in communication with the lower orifice for release of the liquid solution. A closure member is provided to prevent liquid from escaping from the secondary bladder. The closure member provides controlled release of the liquid when desired. Preferably the release button of the secondary bladder is a pneumatic release button, composed of a flexible deformable membrane so that pressing the release button causes pressure within the secondary bladder and causes release of the liquid solution through the lower orifice (when the closure member is in the open position). In a preferred embodiment the closure member is a rotating slide closure member having an arced portion and stem. A stem aperture is aligned with the lower orifice of the secondary bladder and the aperture of the perimeter shelf portion. In operation, the arced portion traverses the brush base in a sliding semi-rotating fashion, moving the stem portion to and fro in relation to the lower orifice of the secondary cylinder. When in the closed position, the stem aperture is not aligned with the lower orifice and aperture of the perimeter shelf portion. In this condition, the stem covers the lower orifice and closes the secondary bladder. Conversely, when the closure member is in the open position, the stem aperture is aligned with the lower orifice and aperture of the perimeter shelf portion so that the secondary bladder is in an open condition to allow liquid to be released. Actuation of the closure member is achieved by way of an external tab in communication with the closure member for moving the closure member into open and closed positions.

Active ingredients delivered in the liquid solution can also include waxes, cleaners, fragrances, therapeutic or moisturizing compounds, hair-conditioning and detangle products, sun protection lotions, mane and tail whiteners and stain removers, dye compositions and other hair-related products, antibacterial compounds, flea and/or tic compounds, and insect repellant, medicaments, or the like. Direct delivery of the active compound onto the surface, coat and mane of the animal or inanimate object provides optimal penetration and effectiveness of the product's treatment. Upon exhaustion of the liquid solution, the second cylinder may simply be reloaded or alternatively, the cylinder may be disposable, in which case replacement cartridges are provided.

An optional supplemental mixing chamber housing a supplemental active ingredient may be provided, which is incorporated upstream from the center cylinder and delivered within the water. In this optional embodiment, the secondary cylinder delivers the primary liquid solution separately and contemporaneously from the water delivery. Active ingredients delivered in the supplemental mixing chamber may include waxes, cleaners, fragrances, therapeutic or moisturizing compounds, hair-conditioning and detangle products, sun protection lotions, mane and tail whiteners and stain removers, dye compositions and other hair-related products, antibacterial compounds, flea and/or tic compounds, and insect repellant, medicaments or the like. Direct delivery of the active compound onto the surface, coat and mane of the animal provides optimal penetration and effectiveness of the product's treatment. Upon exhaustion of the liquid solution, water may continuously pass through the flow regulator into the hose to flush the assembly as well as rinse and finish cleaning the surface or animal.

Fundamental advantages to the novel design of the subject brush assembly include the ergonomical handle construction which is molded having sides with finger indentations integrated therein allowing for a more comfortable grip and a more substantial hold, which appeals to both left and right handed persons, making the handle ambidextrous. The ergonomical handle includes a palm grip area which uniformly molds to the user's palms. The ergonomical handle can be textured for less slippage during use as soap and water are released from the brush. Preferably, the ergonomical handle, as well as all component parts of the brush, are composed of plastic, preferably a thermoplastic, i.e. polycarbonates, polypropylenes, etc., through injection molding, for keeping the brush lightweight. As another addition to the textured top portion of the ergonomical handle, a padded gel-like material may also be integrated within the exterior, particularly in the palm region and/or the finger indentation region, for an enhanced comfort experience when holding the hand held piece. The center cylinder affords a concentrated area for water delivery for a more balanced utility piece, while the base plates for the brush base may be provided as "snap" off or "snap on" extensions to provide varying grooming and utility tools. For example, a base plate may be provided that includes grooming tools comprising: teeth or bristles used for scrubbing and reaching the scalp are of an animal; rounded teeth or rounded fingers used for massaging the scalp of an animal; or a sponge-like material for softer applications such as a shammy/chamois of the type used on cars. Where teeth or bristles are provided, the base plate may be formed with channels in the teeth or bristles that allow water/or solution delivery through the teeth or bristles in addition to the apertures located in the brush base. Preferably the apertures have a diameter ranging from 0.005 inch to 0.060 inches.

The brush yields ergonomic features by way of its ergonomical handle construction. Preferably, the ergonomical handle has measurements of 4"×5"×2" to provide excellent gripping force for a longer period of time for the average sized user. The ergonomical handle construction provides ambidexterity so both left and right-handed users can use it comfortably. The symmetric finger indentations extend around the front and sides of the brush to provide the user with an excellent gripping surface. The top rounded surface on the ergonomical handle provides a more comfortable interface for the palm and fingers, which also adds to the gripping comfort. The ergonomical handle is preferably constructed of PVC-ABS blend, or alternatively ABS, keeping the brush lightweight while maintaining durability. Preferably the brush base is constructed with Santoprene™ or a thermoplastic elastomer (TPE) over-mold to provide durability while protecting the scrubbing surface as it provides a soft feel with excellent strength.

The present brush assembly's application is particularly directed to use with livestock and barn animals such as horses, ponies, llamas, cattle and the like, as well as family pets such as dogs and cats. These animals are oftentimes exposed to infection through parasites, such as ticks, and would benefit from a brush assembly that provided a direct delivery system wherein medicament can be delivered quickly and efficiently to the animal's skin, without having to be rubbed in through the animal's coat. Direct delivery of the active ingredients of the product to the animal's skin and interstitials of the hair or fur of the coat provides optimal application without loss due to run-off from upper surface applications of the product. As a result, exposure and contact of the active ingredients to the individual applying same is mitigated, while the delivery of the active ingredients is achieved in a highly efficient manner.

Other applications of the brush assembly include use in the cleaning and/or treatment of surfaces of inanimate objects, such as substrates of cars, planes, boats and other smooth surfaces. Solutions in such cases preferably involve cleaning products, water wash and waxing products for a clean finish. Base plates in such cases, preferably involve soft bristled grooming and utility tools, sponge surfaces, textured surfaces, and the like.

The brush assembly includes a brush base attached to a hose and flow regulator. The brush assembly has a shampoo, soap, treatment, conditioner, or medicament cavity to supply the desired liquid solution to the substrate or animal appointed for treatment. The direct application brush assembly comprises a molded brush base having an outer perimeter portion, a perimeter shelf portion, and a mid portion with a plurality of apertures integrated therein for delivery of a fluid. At least one base plate has grooming implementations integrated therein and is received on the perimeter shelf portion of the molded brush base. The brush assembly further comprises an ergonomical handle having a palm conforming top and symmetric finger indentation around front and side walls constructed to form an internal cavity. When attached to the outer perimeter portion of the brush base, the ergonomical handle becomes ambidextrous in nature for interchangeable handedness. A center cylinder is located within the internal cavity of the ergonomical handle. The center cylinder comprises a bladder with a bottom surface having a primary opening, a top surface, and a side wall having an orifice. The primary opening of the center cylinder is adapted to align with the mid portion of the brush base. The orifice of the side wall of the center cylinder is adapted to receive a hose for fluid delivery which, in turn, is connected to a flow regulator. The hose includes a first end fitted with the flow regulator and a second end fitted to the orifice of the side wall of the center cylinder so that the hose delivers the fluid from the flow regulator into the bladder of the center cylinder. The flow regulator controls delivery of the fluid into the hose and visa vie the bladder of the center cylinder attached to the brush base, releasing the fluid through the apertures in the mid portion of the brush base. A secondary cylinder is located within the internal cavity of the ergonomical handle. The secondary cylinder receives and holds a liquid solution. It comprises a secondary bladder with a lower surface having a lower orifice aligned with the secondary aperture of the perimeter shelf portion. In addition, the secondary cylinder comprises side walls, and a top surface having a release button in communication with the lower orifice for release of the liquid solution. A closure member is provided to prevent liquid from escaping from the secondary bladder. The closure member provides controlled release of the liquid when desired. In a preferred embodiment, the closure member is a rotating slide closure member having an arced portion and stem with a stem aperture that is aligned with the lower orifice of the secondary bladder and the aperture of the perimeter shelf portion. The release button of the secondary bladder is a pneumatic release button, composed of a flexible deformable membrane. Pressing the release button creates pressure within the secondary bladder, which causes release of the liquid solution through the lower orifice.

The flow regulator operates to flush fluid through the hose and into the brush base. Such fluid is preferably water or an aqueous solution. A mixing chamber may be attached to the flow regulator to provide supplemental solution treatment separate from the liquid housed in the secondary cylinder. This mixing chamber preferably contains a water soluble compound comprised of active ingredients. Water from the flow regulator is mixed with the compound within the mixing chamber to form a liquid solution, which is delivered through the hose into the internal cavity and bladder of the center cylinder through apertures in the mid portion of the brush base, and onto the animal's coat. Upon exhaustion of the liquid solution, the brush may be removed from the animal. Alternatively, water may continue to flow through the hose to rinse the animal. The rinsing solution is preferably a shampoo or soap solution. Generally stated, the invention consists of a brush base which releases fluid and/or liquid solution containing soap, shampoo, conditioner, treatment, medicament, fragrance, perfume and/or other active compositions during brushing via a flow regulator. During brushing, the flow regulator is activated. Fluid flows through the hose/tube into the orifice and the internal cavity of the brush and into the bladder located therein, to be delivered through the apertures of the brush base.

The base plate is connected to the brush base by a snap-fit. It includes grooming implementations, such as bristles, rounded, flat or pointy; a sponge, or bristles with channels/central apertures therein for further fluid delivery. Also included is a secondary aperture for delivery of a liquid solution, such as soap, shampoo, or other treatments aligned with the secondary cylinder. The base plate is preferably composed of a flexible deformable membrane preferably made from rubber having a thickness of 1/32 inch to 3/32 inch, up to 1/8 inch. Where the base includes bristles, the apertures provided for receiving the bristles are typically 0.010-0.60 inches, matching the outer diameter of the bristles used. The bristles are preferably polymeric bodies with rounded ends for contacting hair. The bristles have a diameter ranging from 0.010 inch to 0.060 inches; where the bristles include channels or central apertures, the central apertures have a diameter ranging from 0.005 inch to 0.040 inches. The bristles are preferably permanently bonded to the base plate using glue or other attachment means. Alternatively, the base plate and bristles are composed of a flexible membrane formed via molding by an injection molding process. The process is carried out in a single step to create a one-piece unit which contains both the flexible deformable membrane and the bristles.

Assembly of the brush of this invention comprises the steps of:

1. forming a brush base having an outer perimeter portion, a perimeter shelf portion and a mid portion with a plurality of apertures integrated therein for delivery of a fluid;
2. forming at least one base plate having grooming and/or utility implementations integrated therein, and being received on the molded brush base;
3. forming a center cylinder comprising a bladder with a bottom surface having a primary opening, a top surface, and a side wall having an orifice;
4. aligning the primary opening of the center cylinder with the mid portion of the brush base and placing it upon the brush base;
5. forming a secondary cylinder appointed for receiving and holding a liquid solution, and comprising a secondary bladder with a lower surface having a lower orifice, side walls, and a top surface having a release button in communication with the lower orifice;
6. forming a closure member associated with the lower orifice of the second bladder and/or the secondary aperture of the perimeter shelf portion for preventing release of the liquid solution;
7. aligning the lower orifice of the secondary cylinder with the secondary aperture of the perimeter shelf portion and placing it upon the brush base;
8. forming an ergonomical handle having a palm conforming top and finger indentation sides constructed to form an internal cavity, the ergonomical handle being ambidextrous in nature for interchangeable handedness;
9. attaching the ergonomical handle to the outer perimeter portion of the brush base so that the center cylinder and secondary cylinder is located within the internal cavity;
10. connecting a second end of a hose to the orifice of the side wall of the center cylinder;
11. connecting a first end of the hose to a flow regulator for delivery of the fluid into the bladder of the center cylinder;
12. Optionally, a mixing chamber containing a supplemental compound that is substantially a water soluble compound having an active ingredient may be attached to the flow regulator so that as water travels through the flow regulator into the mixing chamber the compound is dissolved to form a supplemental liquid solution.
13. Now the assembled brush is ready to use. It delivers fluid and/or the liquid solution with active ingredients, such as perfume, fragrance and/or other active compositions, when the brush is used to brush human or pet hair or livestock through the secondary cylinder and the supplemental mixing chamber where applied.

Plastic materials having particular application in manufacturing the subject brush assembly include polyvinyl chloride (PVC) and acrylonitrile butadiene styrene (ABS). A vast array of animal health care products, soaps, shampoos, compounds and solutions can be applied through use of the subject brush, such as those set forth in Table I hereinbelow.

TABLE I

| Product | Application |
| --- | --- |
| ULTRASHIELD ™ | Insecticide & Repellent |
| SUPERSHIELD RED ™ | Water-Resistant Fly Repellent |
| SUPERSHIELD GREEN ™ | Horse Spray, Herbal Gel & Super Concentrate |
| SHOWSHEEN ™ | Hair Polish & Detangler |
| ULTRASCREEN ™ | Maximum Sun Protection Lotion & Fade Protection |
| SUPERPOO & SHOWCLEAN ™ | Mane & Tail Whitener & Stain Remover |
| ABSORBINE ® | Varying Application; Muscle, Joint And Arthritis Pain Reliever; |

Figure 2:
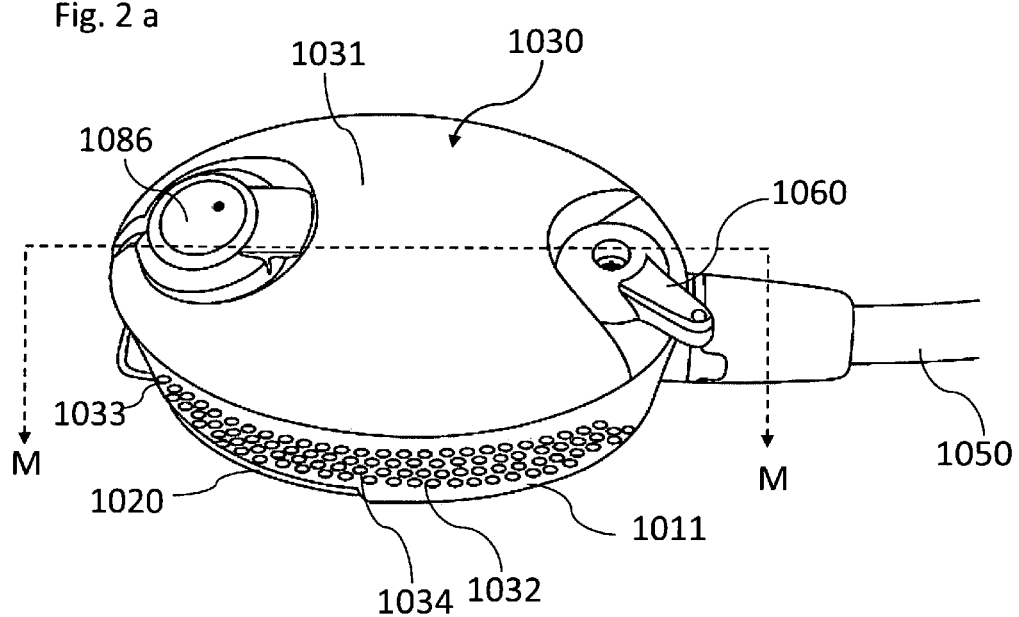
FIG. 2a is a top planer view of the brush assembly.
FIG. 2b is a top side planer view of the brush assembly.
Figure 2:
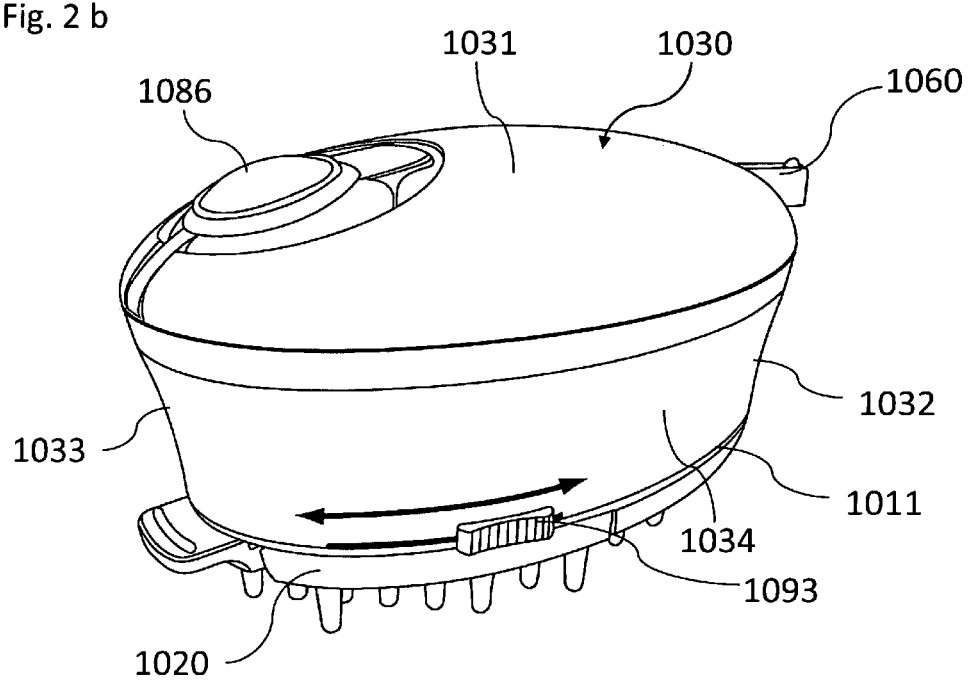
Figure 5A:
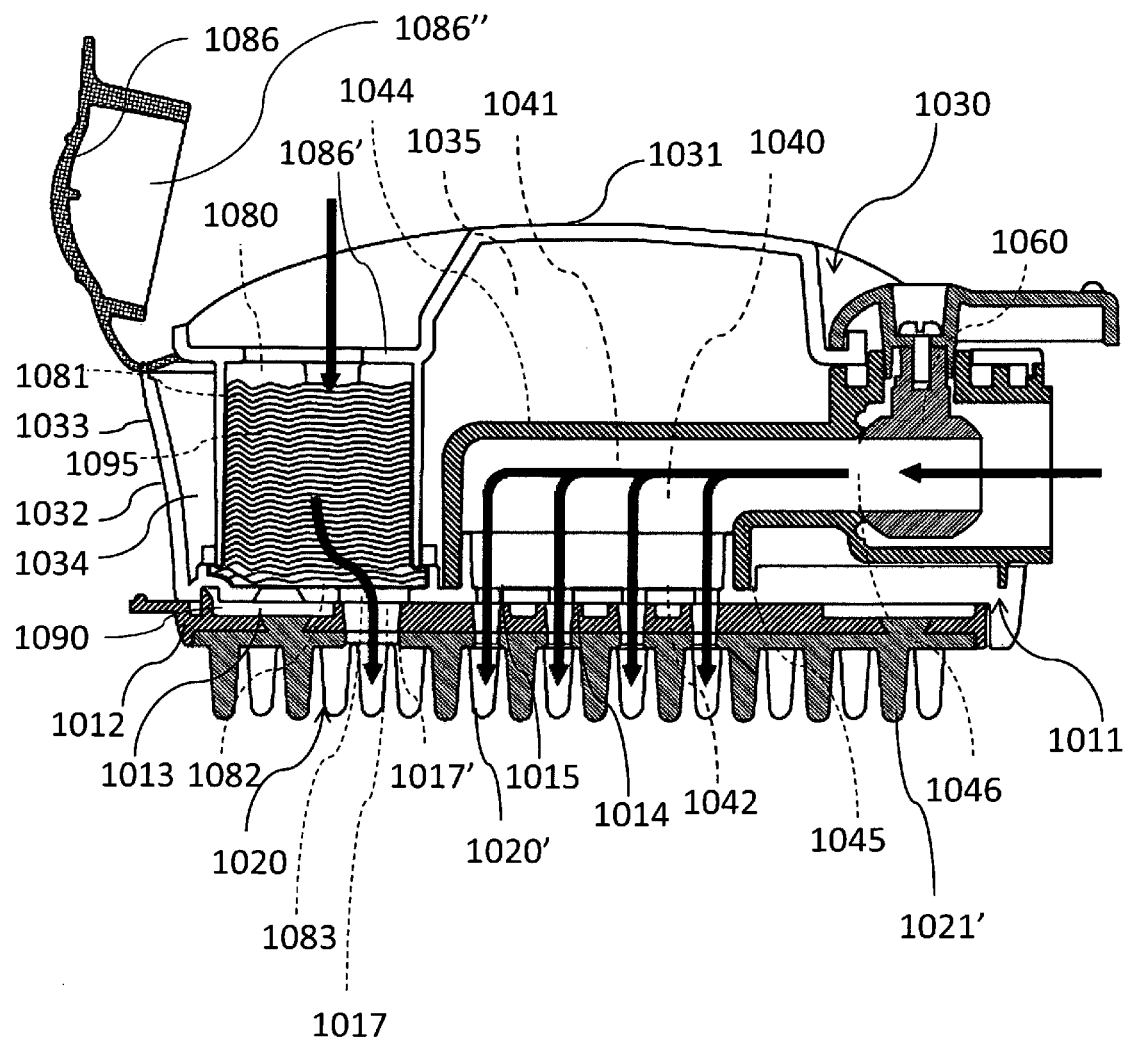
FIG. 5a shows a cut-away view of FIG. 2a taken at M-M, wherein liquid is poured into or placed into the secondary bladder, the bladder is in the open condition, and the closure member is in the open position.
Figure 5C:
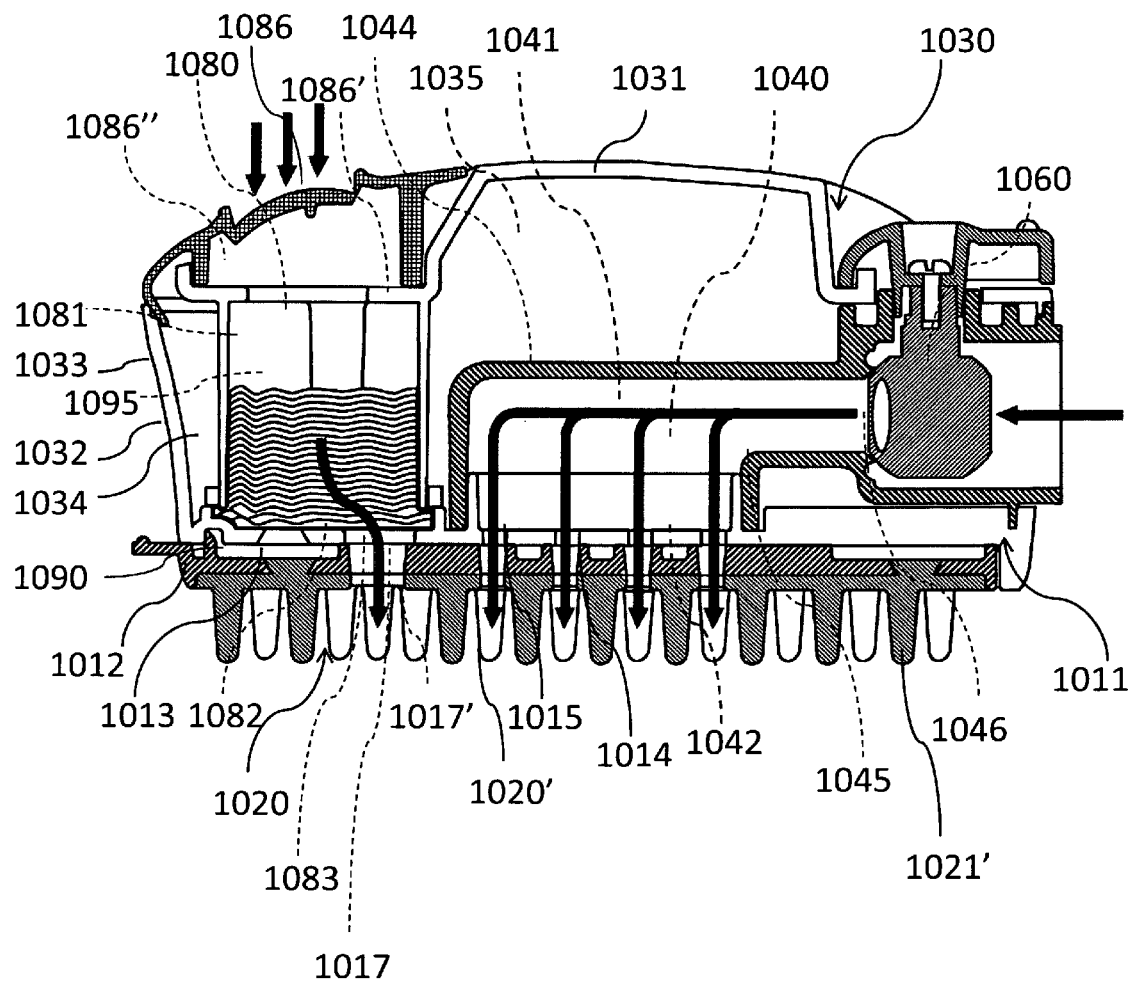
FIG. 5c shows a cut-away view of FIG. 2a taken at M-M, wherein liquid is loaded in the secondary bladder, the bladder is in the closed condition, and the closure member is in the open position—and the release button is a pneumatic release and is pressed causing pressure within the bladder and forcing release of the liquid solution.

FIG. 1 is a top planer view of an embodiment of the brush assembly in the assembled conditions, showing the brush base, ergonomical handle, hose and flow regulator, shown generally at 1000. FIG. 2a is a top planer view of the brush assembly, while FIG. 2b is a top side planer view of the brush assembly. FIGS. 3a and 3b illustrate bottom views of the brush assembly wherein a base plate having bristles is attached onto the brush base. Conversely, FIGS. 4a and 4b are bottom views of the brush assembly wherein a base plate having a sponge is attached onto the brush base. FIGS. 5a-5c show cut-away views of FIG. 2a taken at M-M wherein FIG. 5a illustrates the bladder in the open condition; FIG. 5b illustrates the bladder in the closed condition; and FIG. 5c illustrates the bladder just before the release button is pressed/activated.

Referring to FIGS. 1-5c, brush assembly 1000 includes a molded brush base 1011 having an outer perimeter portion 1012, perimeter shelf portion 1013 and a mid portion 1014 with a plurality of apertures 1015 integrated therein for delivery of a fluid (best illustrated in cross-sectional views 5a-5c). At least one base plate 1020 is provided, having grooming implementations integrated therein, herein shown as base plate 1020' with teeth or bristle elements 1021' and aligned apertures 1015' in FIG. 3a, 3b and shown as a base plate 1020" with a sponge element in 1021" in FIG. 4a, 4b. Base plate 1020 (1020'; 1020") is received on the perimeter shelf portion 1013 of the molded brush base 1011. Preferably, it is simply snapped onto the brush base 1011. Each base plate 1020 further includes a base plate secondary aperture 1017' which aligns with the aperture 1017 of the perimeter shelf portion 1013 of the molded brush base 1011. Base plate 1020 is appointed to snap onto the brush base for removable attachment thereto.

Preferably, the base plate 1020 is removable by means of a snap-on attachment to the brush base 1011 at the outer perimeter portion 1012 and perimeter shelf portion 1013 regions. Alternatively the base plate 1020 is formed as an integral part of the brush base 1011. Preferably, the brush base 1011 and base plate 1020 are composed of flexible deformable membranes. For embodiments where base plate 1020 is removable from brush base 1011, as shown in FIGS. 3a-4b, the base plate may be disposable. Bristles elements 1021' in FIG. 3a, 3b are herein shown having a cone shape, but bristle elements 1021' may have an elongated rectangular or cylindrical shape, or any suitable shape for combing between hairs or fur of the coat of an animal. Alternatively, the bristle elements 1021' may have a rounded top in order to provide massaging treatment.

The brush assembly further comprises an ergonomical handle 1030 having a palm conforming top 1031 and symmetric finger indentations 1032 around front 1033 and side walls 1034 constructed to form an internal cavity 1035. The ergonomical handle 1030 is attached to the outer perimeter portion 1012 of the brush base 1011. Construction of the ergonomical handle 1030 is ambidextrous in nature for interchangeable handedness. The palm conforming top 1031 and symmetric finger indentations 1032 integrated in the front 1033 and side walls 1034 allow a right-handed user or a left-handed user to comfortably grip the ergonomical handle 1030.

A center cylinder 1040 is located within the internal cavity 1035 of the ergonomical handle 1030 (best shown in FIGS. 5a-5c). Center cylinder 1040 comprises a bladder 1041 with a bottom surface 1042, a top surface 1044, and a side wall 1045 having an orifice 1046. The orifice 1046 of the side wall 1045 is adapted to receive a hose/tube 1050 (FIG. 1) which, in turn, is connected to a flow regulator 1060, for fluid delivery into the bladder 1041 of the center cylinder 1040. The flow regulator, when integrated within the brush base as shown at 1060, allows for adjustment of water entering into the center cylinder 1040.

Hose 1050 supplies fluid to the center cylinder 1040, and to the brush base 1011. Hose 1050 is lightweight, and has a relatively small diameter with varying length and thickness. As fluid or water is delivered from hose 1050, it traverses orifice 1046 into internal cavity 1040 for delivery into bladder 1041 and apertures 1015 of brush base 1011. This fluid may be water or another fluid substance.

A secondary cylinder 1080 is also located within the internal cavity 1035 of the ergonomical handle 1030. The secondary cylinder 1080 is appointed for receiving and holding a liquid solution 1095 and comprises a secondary bladder 1081 with a lower surface 1082 having a lower orifice 1083 aligned with a secondary aperture 1017 of the perimeter shelf portion 1013 of the brush base 1011 and a secondary base plate aperture 1017. A release button 1086 is provided. A closure member 1090 is provided in association with the lower surface 1082 and lower orifice 1083 of the secondary cylinder 1080.

Preferably, the release button 1086 is a pneumatic release button, composed of a flexible deformable membrane. An inner rim 1086' is preferably provided to create a small internal head space 1086" under the release button 1086 so that force is created within the head space 1086" and travels past the inner rim 1086' to effectively force liquid from the bladder. The head space 1086" also provides the ability to deform or press the release button 1086 inward without the button actually coming into contact with the liquid solution. Pressing of the pneumatic release button 1086 causes the flexible button to deform inward, decreasing the cavity space within the secondary bladder 1081. The resultant pressure exerts a force on the liquid housed within the bladder 1081. When the closure member 1090 is in the open position, this force urges the liquid solution through the lower orifice 1083.

Figure 6A:
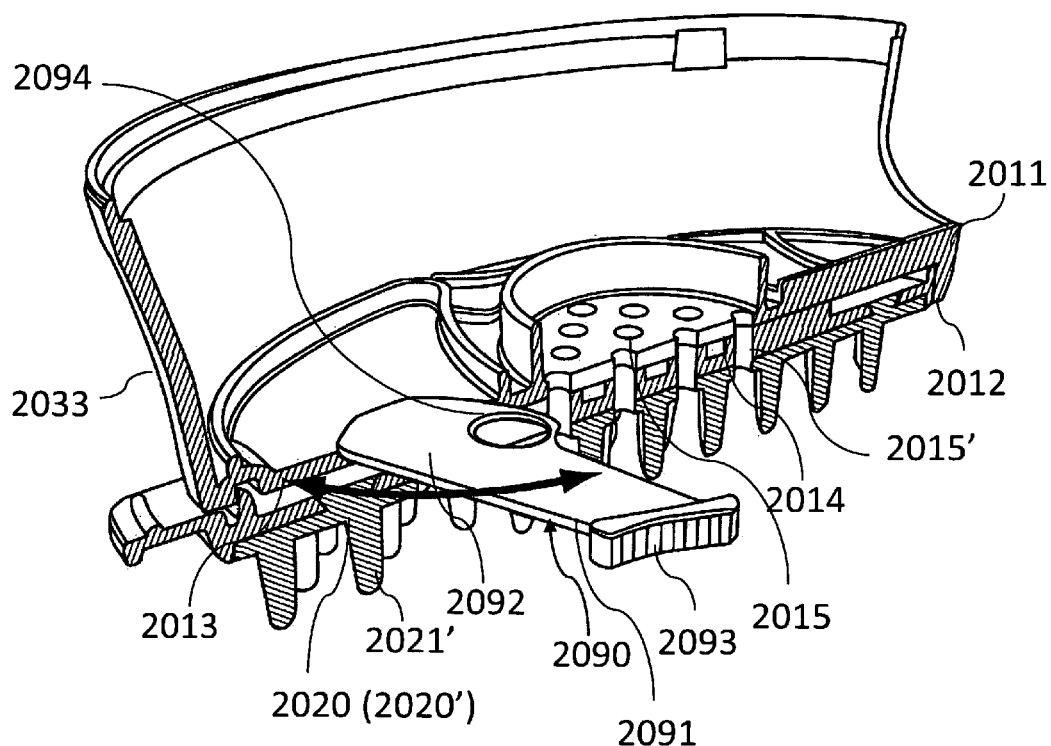
FIG. 6a shows a cut-away view depicting an embodiment of the closure member, wherein the closure member is a rotating slide closure member—the figure shows the closure member in the closed position covering the lower orifice and thereby preventing liquid from escaping from the brush.
Figure 6B:
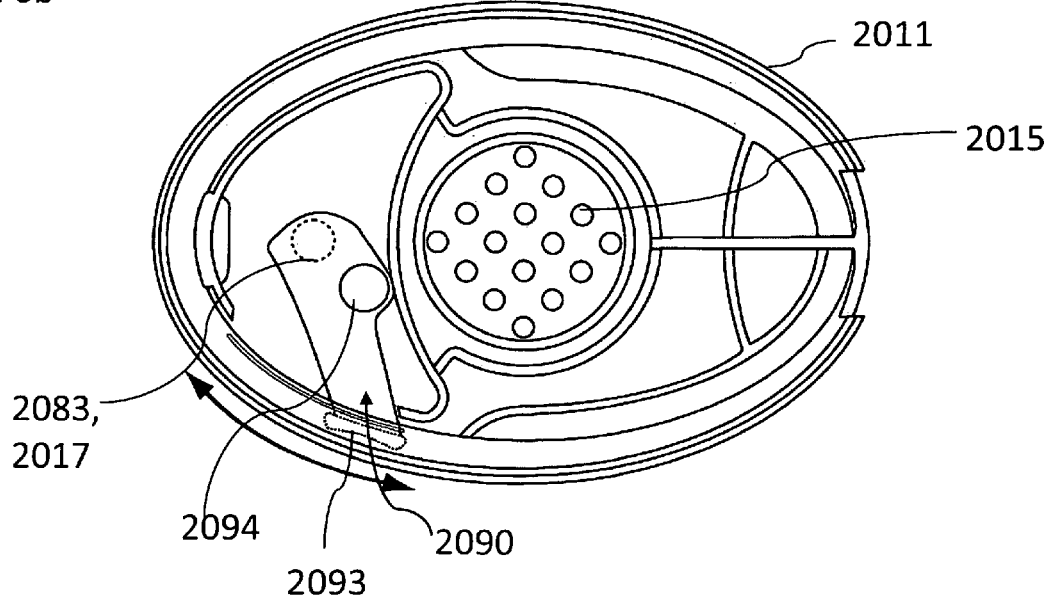
FIG. 6b shows an underside/bottom view of the brush assembly of FIG. 13a, showing the rotating slide closure member in the closed position.
Figure 7A:
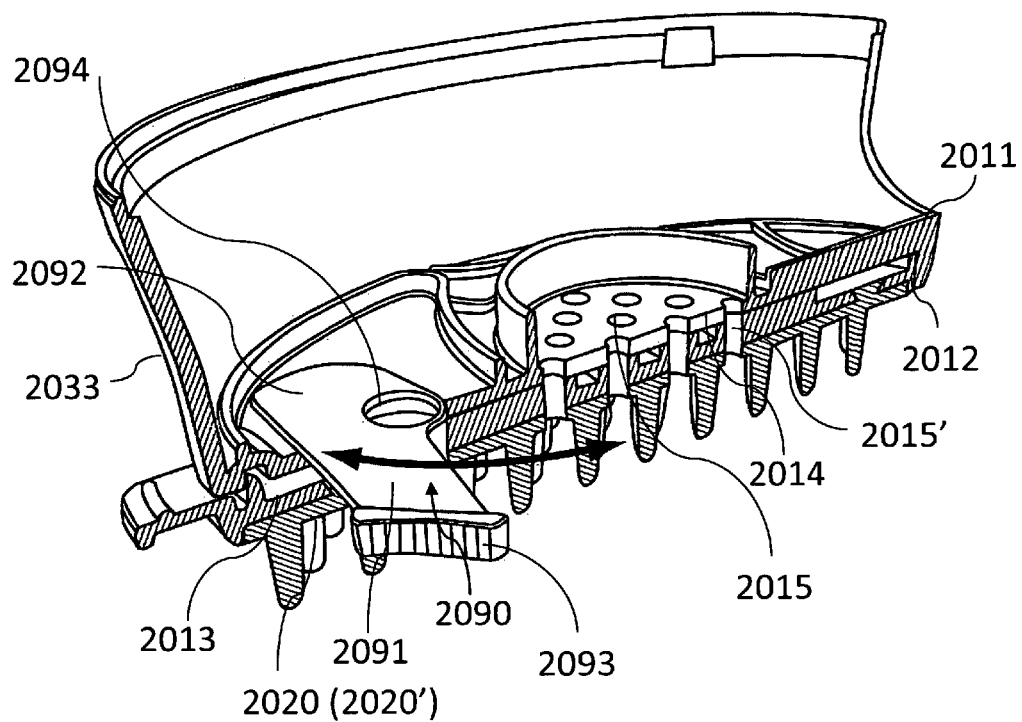
FIG. 7a shows a cut-away view showing an embodiment of the closure member, wherein the closure member is a rotating slide closure member—the figure shows the closure member in the open position aligning with the lower orifice and thereby allowing liquid to escape from the brush upon actuation of the release button.
Figure 7B:
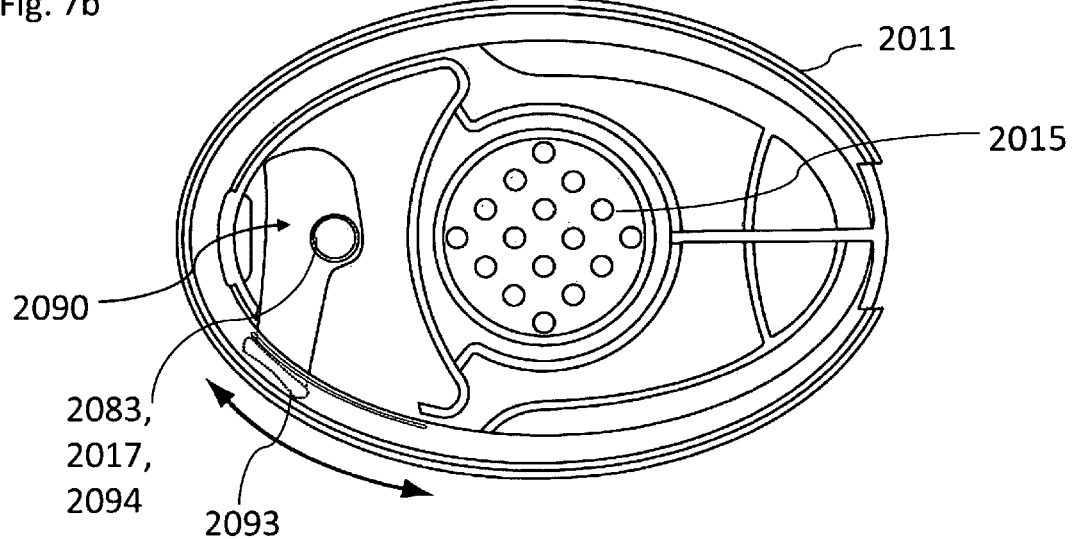
FIG. 7b shows an underside/bottom view of the brush assembly of FIG. 14a, showing the rotating slide closure member in the open position.

In a preferred embodiment the closure member 1090 is a rotating slide closure member with an external tab 1093, as shown at 2090 best illustrated in FIGS. 6a-7b. In referring to FIGS. 6a-7b, the closure member 2090 has an arced portion 2091 and stem 2092 with a stem aperture 2094. The stem aperture 2094 is aligned with the lower orifice, herein shown at 2083 of the secondary bladder shown at 2081 and the aperture 2017 of the perimeter shelf portion 2013 of the brush base 2011. In operation, the arced portion 2091 traverses the brush base 2011 in a sliding semi-rotating fashion, moving the stem portion 2092 to and fro in relation to the lower orifice 2083 of the secondary bladder 2081. When in the closed position as shown in FIGS. 6a, 6b, the stem aperture 2094 is not aligned with the lower orifice 2083 and aperture 2017 of the perimeter shelf portion 2013. Stem 2092 covers the lower orifice 2083 and closes the secondary bladder 2081 so that liquid 2095 is prevented from being released. Conversely, when the closure member 2090 is in the open position as shown in FIGS. 7a, 7b, the stem aperture 2094 is aligned with the lower orifice 2083 and aperture 2017 of the perimeter shelf portion 2013 so that the secondary bladder 2081 is in an open condition to allow liquid 2095 to be released. Actuation of the closure member 2090 is preferably achieved by way of an external tab 2093 in communication with the closure member 2090 for moving the closure member 2090 into open and closed positions (FIGS. 7a-7b and FIGS. 6a-6b, respectively).

Referring back to FIGS. 5a-5c, release button 1086 may be removable, but is preferably hingedly attached to the side wall of the brush base as shown in the open position in FIG. 5a for the insertion of liquid soap/treatment. As the release button 1086 is preferably composed of a flexible deformable membrane/material depression of the button causes pressure in the bladder 1081 and the release of liquid through the lower orifice 1083, stem aperture of the closure member 1090 (when in the open position) and aperture 1014 of the perimeter shelf portion 1013. Depressing the button ejects a small quantity of soap onto the surface to be cleaned. Ejection of liquid from the bladder 1081 can alternatively be accomplished by downward movement of a fan-like brush or the like, acts as a piston in response to pressure applied to the dome. Downward movement of the piston forces liquid or gel downwardly within the bladder causing its ejection therefrom.

Water is separately directed from the chamber in the center of the brush toward the surface to be cleaned. The secondary cylinder 1080 may be incorporated within the brush assembly, or may be removable from the assembly for refill and/or replacement. The liquid is separately, yet simultaneously released with the water from the brush assembly as the animal is being washed through controlled release by way of the release button 1086 and the closure member 1090.

Preferably, the liquid solution is a detergent in the form of a shampoo or soap. Alternatively, the liquid solution may include fragrances, flea and tick medication/repellant, conditioners, anti-itch medication, or a host of other veterinarian treatments. As the liquid is released from the bladder, it is scrubbed with the bristles/sponge element (depending on the base plate being used, see FIGS. 3a-3b, 4a-4b). During this cleaning process, the liquid or gel-like substance is scrubbed with the base plate, causing it foam while water is intermingled therewith. Controlled release of the liquid and water by the flow regulator facilitates release of the desired amount of liquid soap/shampoo onto the animal or surface, whereby the animal or surface is scrubbed, while water is utilized to directly clean all of the soap/liquid residue left thereon.

Washing horses and livestock can be problematic owing to the presence of numerous washing buckets. In such cases, washing components such as soap, sponges, and rinse water are necessary prerequisites. Use of the brush assembly along with the optional mixing chamber provides the ability to deliver the soap and water in a highly efficient, functional manner. At the same time, the brush assembly and optional mixing chamber improves the ability to direct the soap deep within the fur follicles, enabling optimal cleaning of the animal's coat and/mane.

FIG. 8 illustrates a schematic view of another embodiment of the brush assembly in the assembled condition, shown generally at 10. In this view, an optional mixing chamber for delivery of a supplemental solution is attached to the flow regulator. Brush assembly 10 includes a molded brush base 11 having an outer perimeter portion 12, perimeter shelf portion 13 and a mid portion 14 with a plurality of apertures 15 integrated therein for delivery of a fluid. At least one base plate 20 has grooming implements integrated therein. These implements are herein shown as teeth or bristle elements 21 or shammy. They are received on the perimeter shelf portion 13 of the molded brush base 11. Preferably, the base plate 20 is removable by means of a snap-on attachment to the brush base 11 at the outer perimeter portion 12 and perimeter shelf portion 13 regions; alternatively the base plate 20 is formed as a part of the brush base 11. Preferably, the brush base 11 and base plate 20 are composed of flexible deformable membranes. When base plate 20 is removable from brush base 11, the base plate may be disposable. Bristles elements 21 are herein shown having a cone shape, but bristle elements 21 may have an elongated rectangular or cylindrical shape, or any suitable shape for combing between hairs or fur of the coat of an animal. Alternatively, the bristle elements 21 may have a rounded top in order to provide massaging treatment.

The brush assembly further comprises an ergonomical handle 30 having a palm conforming top 31 and symmetric finger indentations 32 around front 33 and side walls 34 constructed to form an internal cavity 35. The ergonomical handle 30 is attached to the outer perimeter portion 12 of the brush base 11. Construction of the ergonomical handle 30 is ambidextrous in nature for interchangeable handedness. The palm conforming top 31 and symmetric finger indentations 32 integrated in the front 33 and side walls 34 allow a right-handed user or a left-handed user to comfortably grip the ergonomical handle 30.

A center cylinder 40 is located within the internal cavity 35 of the ergonomical handle 30 and comprises a bladder 41 with a bottom surface 42 having a primary opening 43, a top surface 44, and a side wall 45 having an orifice 46. The primary opening 43 of the center cylinder 40 is adapted to align with the mid portion 14 of the brush base 11, while the orifice 46 of the side wall 45 is adapted to receive a hose 50 for fluid delivery which, in turn, is connected to a flow regulator. The hose 50 includes a first end fitted with the flow regulator 60 and a second end fitted to the orifice 46 of the side wall 45 of the center cylinder 40 so that the hose 50 delivers the fluid from the flow regulator into the bladder 41 of the center cylinder 40. Flow regulator 60 is attached to an optional mixing chamber 70 for mixing water with a supplemental solution or treatment/medicament/shampoo in the mixing chamber 70 to create a supplemental solution for delivery to the brush 10. The flow regulator controls delivery of the fluid into the hose 50, while bladder 41 of the center cylinder 40, attached to the brush base 11, releases the fluid through the apertures 15 in the mid portion 14.

Hose 50 supplies fluid to the center cylinder 40, and to the brush base 11. Hose 50 is lightweight, and has a relatively small diameter with varying length and thickness. Hose 50 includes a first end 52 attached to the flow regulator 60 preferably by way of regulator screw top 66. Flow regulator 60 further comprises a body portion 67 appointed to be attached to a fluid or water supply and includes a threaded portion 68 therein for mating with threads or grooves of the regulator screw top 66 or an optional mixing chamber 70, as herein shown. As fluid/water is delivered from flow regulator 60 it passes into hose 50 and traverses orifice 46 into internal cavity 40 for delivery into bladder 41 and apertures 15 of brush base 11. This fluid may be water or another fluid source. Flow regulator 60 controls delivery of fluid into hose 50 and bladder 41 of center cylinder 40 located in the brush base 11. When brushing fur or hair, or inanimate surfaces, fluid is released through apertures 15 onto the animal's fur or hair or inanimate surface, wherein it is immediately brushed, massaged, polished or the like with interchangeable faces. With this arrangement, the brush assembly is easy to maneuver and fluid supply can be continuous or intermittent.

A secondary cylinder 80 is also located within the internal cavity 35 of the ergonomical handle 30. The secondary cylinder 80 is appointed for receiving and holding a liquid solution and comprises a secondary bladder 81 with a lower surface 82 having a lower orifice 83 aligned with a secondary aperture 17 of the perimeter shelf portion 13 of the brush base 11 and a secondary base plate aperture 24, side walls 84, and a top surface 85. A closure member 2090 is located between the secondary bladder 81 and perimeter shelf portion 13. Closure member 2090 is preferably constructed as discussed herein and shown in FIGS. 6a-7b. Closure member 2090 is associated with the lower surface 82 and lower orifice 83 of the secondary cylinder 80 and the aperture 17 of the perimeter shelf portion 13 for regulating the liquid release and preventing liquid from unwittingly escaping from the bladder.

Top surface 85 includes a release button 86 in communication with the lower orifice 83 for controlled release of the liquid solution. Release button 86 may removed to insert liquid soap/or may be hingedly connected for opening thereof to insert the liquid/soap. Preferably the release button 86 is pneumatic in nature, composed of a flexible deformable membrane, such as rubber, in order to cause pressure in the bladder when deformed/pressed and force liquid from the chamber when the closure member is in the open position. Depressing the button ejects a small quantity of soap onto the surface to be cleaned. Water is separately directed toward that surface from the chamber in the center of the brush.

The secondary cylinder 80 may be incorporated within the brush assembly, or may be removable form the assembly for refill and/or replacement. Secondary cylinder 80 is preferably a secondary "sale" item or after market replacement item, with replacement cylinders 80 available. The secondary cylinder 80 houses a liquid appointed to be directly delivered onto the animal's coat with controlled release via release button 86. The liquid is separately, yet simultaneously released with the water from the brush assembly as the animal is being washed. Preferably, the liquid solution is a detergent in the form of a shampoo or soap. Alternatively, the liquid solution may include fragrances, flea and tick medication/repellant, conditioners, anti-itch medication, or a host of other veterinarian treatments. As the liquid is released it is scrubbed with the bristles 21 of the base plate 20 and foams while water is intermingled. Controlled release of the liquid as well as the water via flow regulator 70 allows the users to release the desired amount of liquid soap/shampoo onto the animal, scrub the animal, and utilize water to directly clean all of the soap/liquid from the animal.

Release button 86 operates to release the liquid soap onto the animal. Release button 86 is preferably a pneumatic release button composed of a flexible deformable membrane as discussed herein above. Alternatively, the release button 86 may be constructed as a pump mechanism commonly utilized to dispense soaps. In such a pump mechanism, a trigger lever is provided, which activates a small pump. The pump is attached to a plastic tube that draws cleaning fluid/liquid from the bottom of the reservoir. The pump forces this liquid down a narrow barrel and out a small hole/lower orifice 83 and, by means of secondary aperture 17 and secondary base plate aperture 24, is delivered onto the animal's coat. The lower orifice 83, secondary aperture 17 and secondary base plate aperture 24 serve to focus the flowing liquid so that it forms a concentrated stream. The fluid pump includes a piston, housed inside a cylinder along with a small spring. To operate the pump, the user presses the release button 86, pushing the piston into the cylinder. The moving piston compresses the spring. When the release button 86 is released, the piston is pushed back out of the cylinder. These two strokes of the piston, into the cylinder and out again, constitute a pump cycle. The piston pushing in shrinks the area of the cylinder, forcing fluid out of the pump. The upstroke, the spring pushing the piston back out, expands the cylinder area, sucking fluid into the pump. In this embodiment, the top surface 85 with release button 86 is removable from the secondary cylinder 80 by means of a screw. Replacement cylinders 80 can be provided in which the top surface 85 and release button 86 are simply screwed-onto the replacement cylinder 80 and/or liquid is reloaded into the secondary cylinder 80 and the top 85, with release button 86, is screwed back onto the cylinder 80. Alternatively, the whole secondary cylinder 80 unit may simply be replaced.

In the embodiment shown in FIG. 8 the optional mixing chamber 70 is incorporated into the brush assembly. The use of the mixing chamber 70 is generally needed in cases where a supplemental solution beyond that provided by the secondary cylinder 80 is desired. For example, if the liquid soap delivered via secondary cylinder 80 is a shampoo/conditioner for the fur, and the animal is also in need of anti-itch or flea medication, the user can simply snap-on an optional mixing chamber 70 to provide the supplemental flea medication. The optional mixing chamber 70 houses a supplemental compound appointed to be mixed with water delivered from flow regulator 60 to form a supplemental liquid solution. This supplemental liquid solution is fed through hose 50 into bladder 41 for dissemination of the liquid solution onto the animal's fur or hair. It acts supplemental to the liquid solution of the secondary cylinder, where needed. The supplemental liquid solution preferably includes active ingredients comprising grooming and cleaning products for a coat of a horse and livestock. It may include shampoos, soaps, perfumes, fragrances, whiteners and/or other active compositions comprising insect repellant, flea repellants and treatments, tic repellant, mane and tail and hair conditioning compositions, dye compositions, moisturizing ingredients, or antibacterial compounds.

Preferably the compound housed in the mixing chamber 70 is a semi-solid compound soluble in an aqueous environment to form the liquid solution appointed for delivery through hose 50. Most preferably, this semi-solid compound is a shampoo or soap. In application of this embodiment, the soap or shampoo in semi-solid form in the cylindrical mixing chamber 70, dissolves slowly as water is forced into mixing chamber 70 by way of flow regulator 60. As the semi-solid soap compound dissolves, it suds or soaps-up to provide a soapy liquid solution that is delivered through hose 50. After approximately three to five minutes, the semi-solid compound is substantially exhausted and the soapy liquid solution becomes diluted and consists substantially of water. Water continues to flow through flow regulator 60, (emptied) mixing chamber 70 and hose/tube 50 to clean and rinse the animal. Mixing chamber 70 is preferably constructed as a cylinder having a chamber top 71 that mates with regulator screw (or snap) top 66, and a chamber bottom 72 that screws (or snaps) onto or otherwise attaches to threaded portion 68 of flow regulator 60. Mixing chamber 70 is preferably a secondary "sale" item or after market replacement item, with replacement mixing chambers available.

Figure 9C:
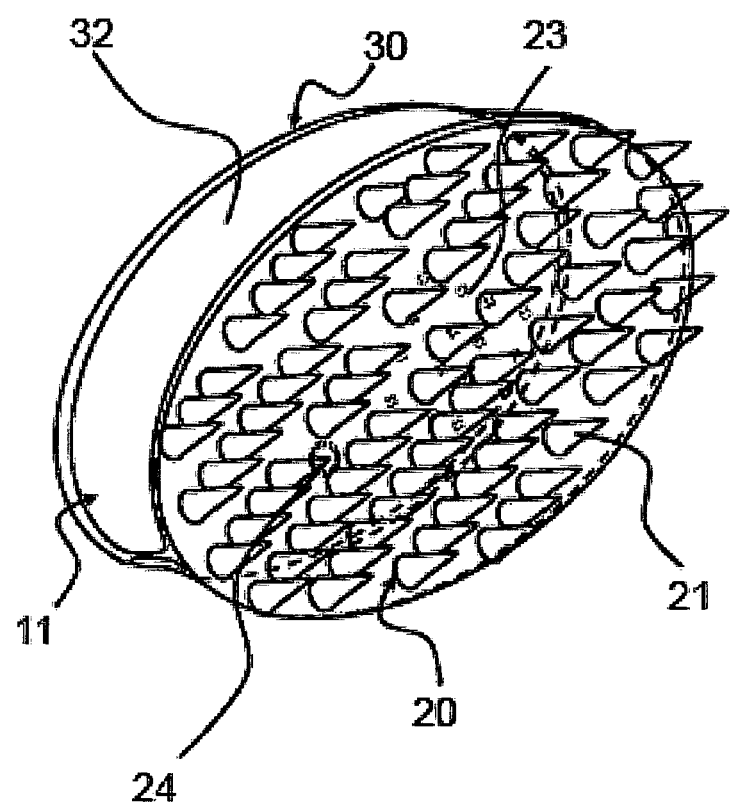
FIG. 9c is a bottom view of the embodiment of the brush assembly of FIG. 8, shown in the assembled condition.
Figures 10, 11:
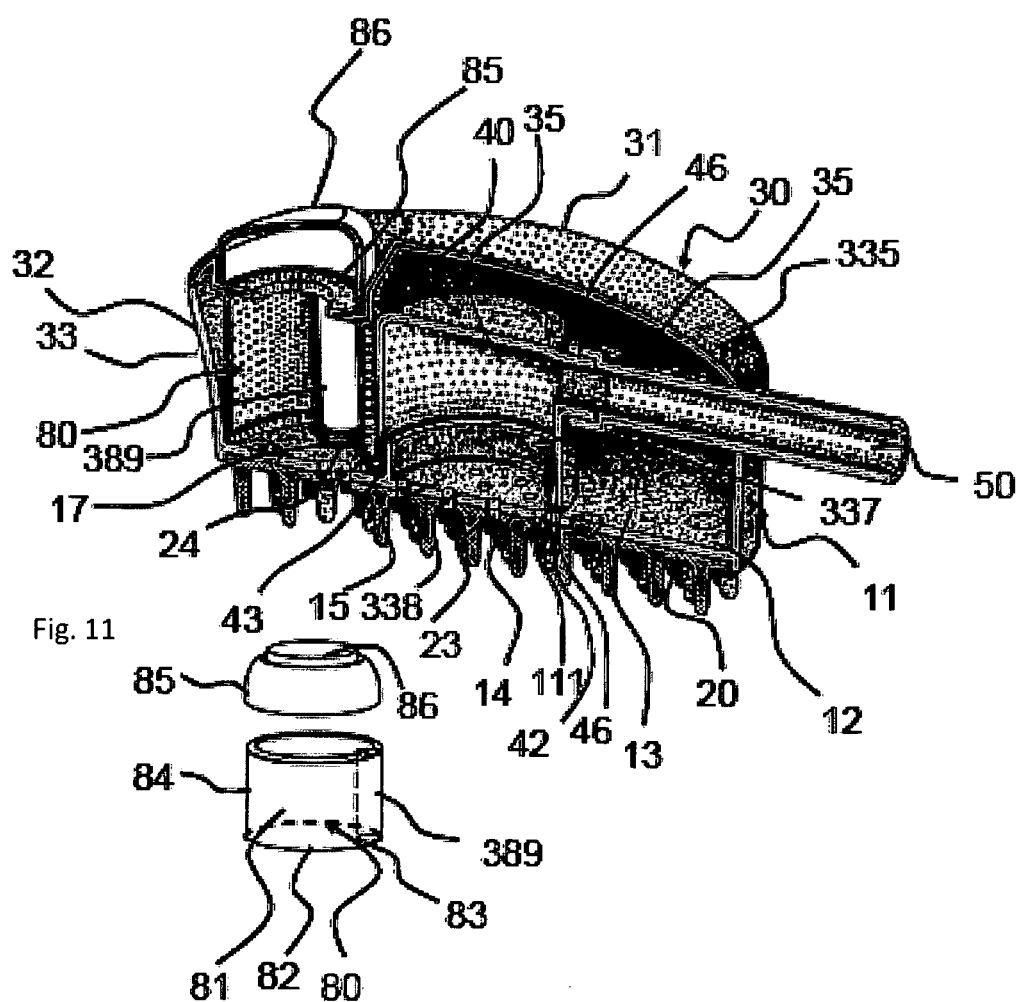

FIGS. 2a and 2b illustrate top, bottom-side (shown in a user's hand) and bottom views of the embodiment of the brush assembly of FIG. 8, shown in the assembled condition. Additionally, FIG. 10 shows a cross-sectional cut-out view taken along X-X of FIG. 9a. Referring to FIGS. 2a-2b and 3, outer perimeter portion 12 and perimeter shelf portion 13 of molded brush base 11 are attached to base plate 20. Attachment is preferably achieved by way of snap-on fastening. Alternatively, attachment may be achieved through use of industrial hook and loop fasteners, such as those sold under the trade name Velcro, matingly located on the back of the base plate 20 and on the perimeter shelf portion 13 of the brush base 11. Alternatively, the base plate 30 may be integrated within molded brush base 11 and produced via injection molding as a single unit. Water or solution is delivered through mid portion 14 of brush base 11 by way of the plurality of apertures 15 integrated therein, which are also aligned with/integrated within base plate apertures 23. Preferably theses apertures have a diameter ranging from 0.005 inch to 0.060 inches. Moreover, a secondary aperture 17 and a secondary base plate aperture 24 are provided for liquid solution delivery via the secondary cylinder 80. Preferably these apertures each have a diameter ranging from 0.060 inches to 0.25 inches.

Brush base 11 may be constructed of a plastic material such as a polycarbonate blend. Preferably the brush base is constructed with Santoprene™ or a thermoplastic elastomer (TPE) over-mold to provide durability while protecting the scrubbing surface as it provides a soft feel with excellent strength. Preferably, base plate 20 is also composed of a Santoprene™ or a thermoplastic elastomer (TPE) over-mold to provide durability and a soft feel. Base plate 20 is shown herein with bristle elements 21. Rather than bristle elements 1021, the grooming implement on the base plate 20 may be a sponge as shown in later figures herein. Interchangeability of base plate 20 allows a user to use the optimal grooming tool needed by simply changing out the base plate—bristles for brushing or scrubbing, or a sponge for softer applications. Bristle elements 21 are herein shown having a cone shape, but bristle elements 21 may have an elongated rectangular or cylindrical shape, or any suitable shape for combing between hairs or fur of the coat of an animal. Alternatively, the bristle elements 21 may have a rounded top in order to provide massaging treatment. Center cylinder 40 is housed within ergonomical handle 30 and brush base 11.

The mid portion 14 of the molded brush base 11 includes parallel interior walls 111 (best seen in FIG. 10). Interior walls 111 are adapted to receive a rim 46 of the primary opening 43 of the bottom surface 42 of the center cylinder 40 for substantially sealing the center cylinder 40 to the brush base 11 for the fluid delivery through the plurality of apertures 15 integrated within the mid portion 14. The palm conforming top 31 and symmetric finger indentations 32 around front 33 and side walls 34 of ergonomical handle 30 provide optimal comfort and interchangeability for either a left-handed user or a right-handed user. An internal cavity 35 is formed within the ergonomical handle for accommodating the center cylinder 40 (not shown in FIGS. 2a-2b; see FIG. 10). The ergonomical handle 30 is preferably constructed with two parallel mating portions 335 (only one of which 335 is shown). Each parallel mating portion 335 snaps together and, in turn, snaps onto the brush base 11 in a tight, water sealed manner to prevent any fluid leakage from the brush and to optimally contain the center cylinder 40. A center cylinder encasement wall 337 is also preferably provided for enhanced securing of the center cylinder 40, preventing the center cylinder 40 from moving within the handle 30. The ergonomical handle 30 is snap-fit attached to the outer perimeter portion 12 of the brush base 11 in a water tight manner. Hose 50 is shown connected to the orifice 46 region of the center cylinder 40 which preferably includes a slightly tapered configuration/tapered portion 47 for hose 50 fit; in turn the hose 50 is connected to the flow regulator. Preferably, the primary opening 43 of the center cylinder 40 includes a deformable flexible membrane snap cap 338 which includes membrane apertures integrated therein. These membrane apertures are in alignment with the apertures 15, 23 of the mid portion of the brush base 11 and base plate 20, respectively, for fluid delivery. In turn, mid portion 14 with apertures 15 of brush base 11, may be constructed of a flexible deformable membrane.

Secondary cylinder 80 is also located within the internal cavity 35 of the ergonomical handle 30. The secondary cylinder 80 is shown in FIG. 11. In referring to both FIGS. 3 and 4, the secondary cylinder 80 is appointed for receiving and holding a liquid solution and comprises a secondary bladder 81. It is constructed generally having a lower surface 82 with a lower orifice 83 integrated therein. Lower orifice 83 is aligned with the secondary aperture 17 of the perimeter shelf portion 13 of the brush base 11 which, in turn, is aligned with the secondary base plate aperture 24 of base plate 20. Secondary cylinder 80 further includes side walls 84, and a top surface 85. Top surface 85 includes a release button 86 in communication with the lower orifice 83 for controlled release of the liquid solution. The secondary cylinder 80 may be incorporated within the brush assembly, or may be removable from the assembly for refill and/or replacement. Secondary cylinder 80 is preferably a secondary "sale" item or after market replacement item, with replacement cylinders 80 being available for that purpose. The secondary cylinder 80 houses a liquid appointed to be directly delivered onto the animal's coat with controlled release via release button 86. The liquid is separately, yet simultaneously, released with the water from the brush assembly as the animal or inanimate surface is being washed. Preferably, the liquid solution is a detergent in the form of a shampoo or soap. Release button 86 operates to release the liquid soap onto the animal. Mechanically, release button 86 is preferably constructed as a pump mechanism commonly utilized to dispense soaps. A trigger lever activates a small pump 389 that forces the liquid out lower orifice 83 and by means of secondary aperture 17 and secondary base plate aperture 24 is delivered onto the animal's coat. The lower orifice 83, secondary aperture 17 and secondary base plate aperture 24 serve to focus the flowing liquid so that it forms a concentrated stream.

Figure 12A:
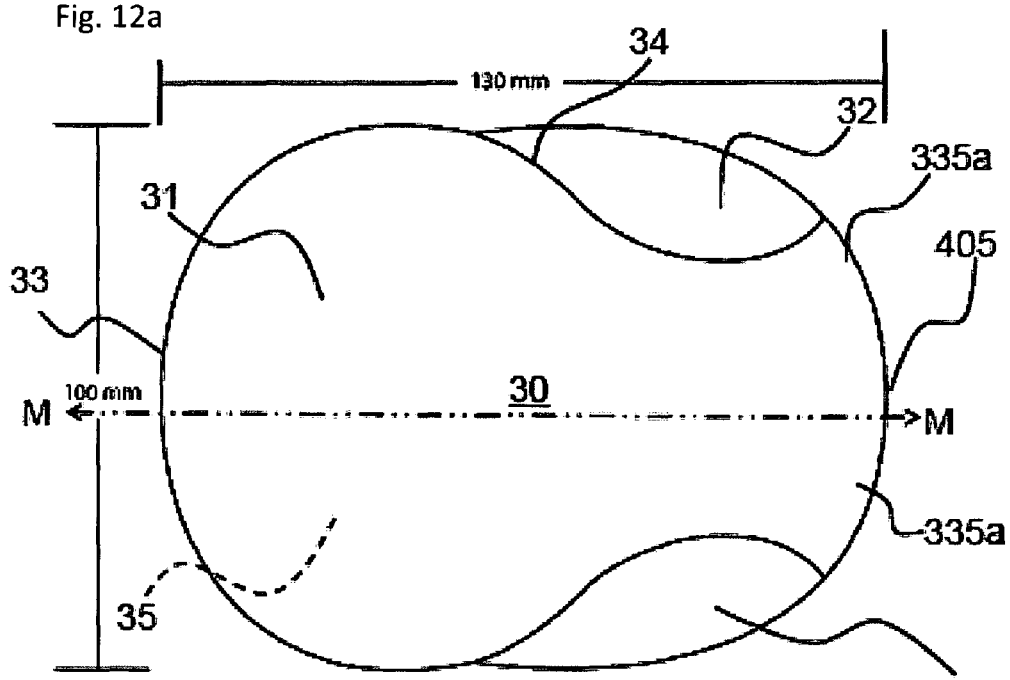
FIG. 12a illustrates a top planer view of the ergonomical handle.
Figure 12B:
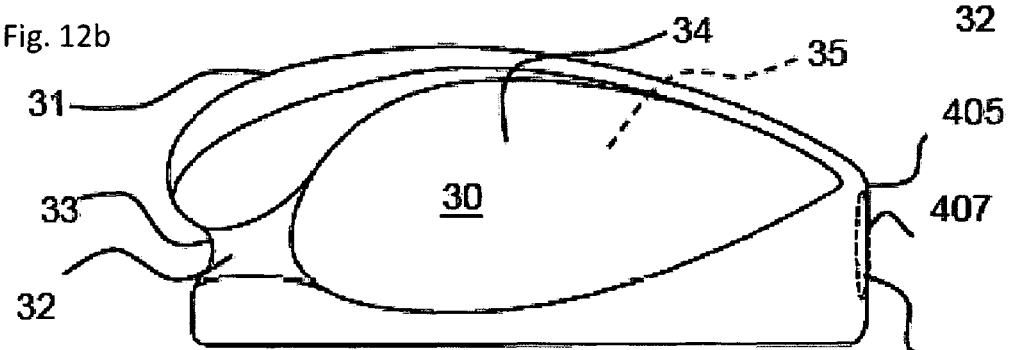
FIG. 12b illustrates a side planer view of the ergonomical handle.
Figure 12C:
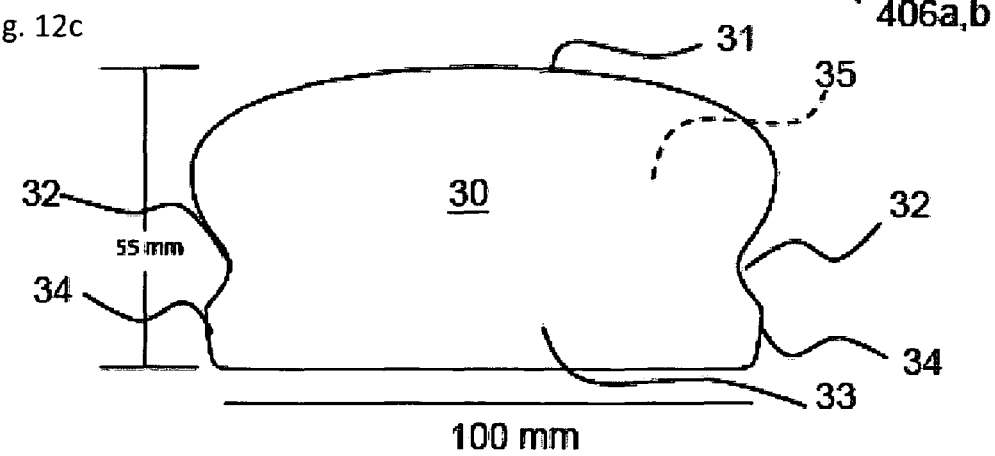
FIG. 12c illustrates a front planer view of the ergonomical handle.

FIGS. 12a, 12b and 12c illustrate top, side and front views of the ergonomical handle. The ergonomical handle 30 includes a palm conforming top 31 and symmetric finger indentations 32 around front 33 and side walls 34, for providing optimal interchangeable comfort to either a left-handed user or a right-handed user. Moreover, the ergonomical handle 30 includes a back wall 405. The two parallel mating portions 335, which snap together to form the brush, include c-shaped or arc shaped cut-outs 4013a, 4013b. When the two parallel mating portions 335a, 335b are snapped together along a center line M-M, the c-shaped cut-outs form a circular or arced orifice 407 that accommodate the tapered portion 47 of central cylinder 40 which, in turn, receives the hose/tube 50.

The brush yields ergonomic features by way of its ergonomical handle construction. Preferably, the ergonomical handle has measurements of 4"×5"×2" to provide excellent gripping force for a substantial period of time. The ergonomical handle construction provides ambidexterity to improve comfort for both left and right-handed users. The symmetric finger indentations extend around the front and sides of the brush to provide the user with an excellent gripping surface. The top rounded, soft-touch surface on the ergonomical handle provides a more comfortable interface for the palm and fingers, which also add to the gripping comfort. The ergonomical handle is preferably constructed of PVC-ABS blend, or alternatively ABS, keeping the brush lightweight while maintaining durability. Preferably the brush base is constructed with Santoprene™ or a thermoplastic elastomer (TPE) over-mold to provide durability while protecting the scrubbing surface as it provides a soft feel with excellent strength.

Figure 13A:
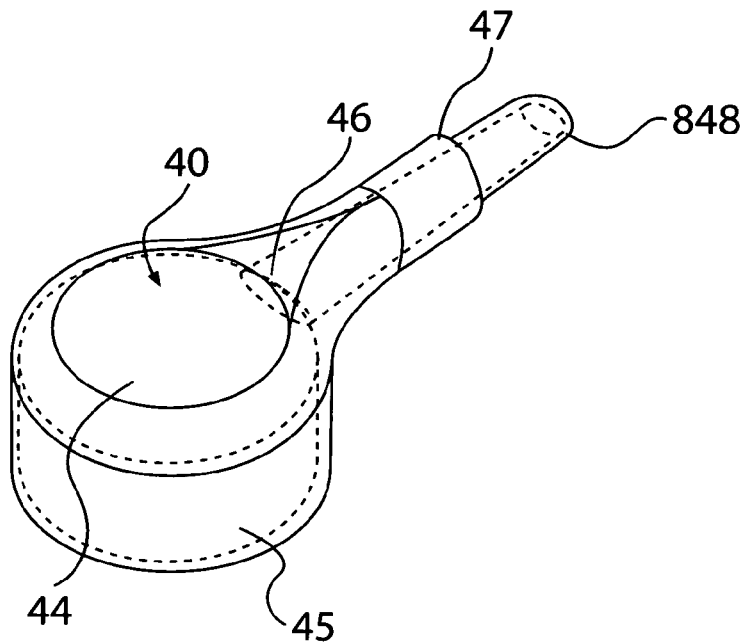
FIG. 13a illustrates a top view of the center cylinder.
Figure 13B:
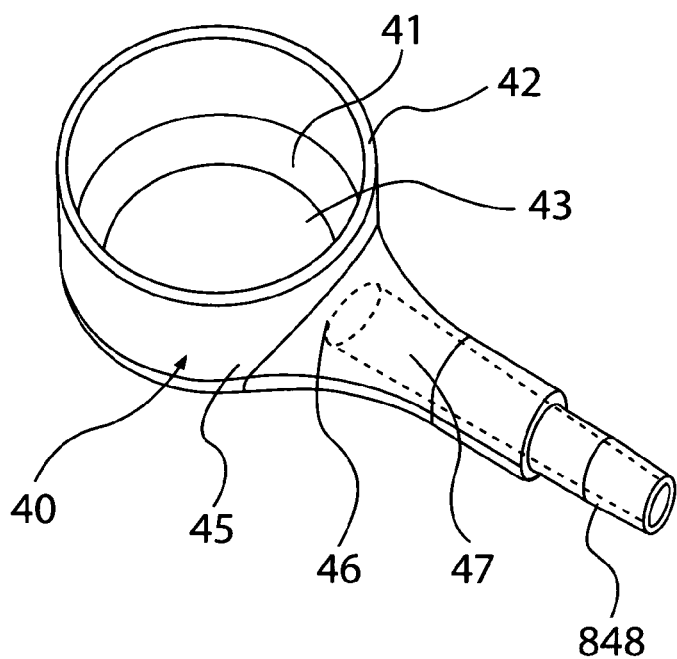
FIG. 13b illustrates a bottom view of the center cylinder.

FIGS. 13a and 13b show top and bottom views of the center cylinder. Center cylinder 40 comprises a bladder 41 with a bottom surface 42 having a primary opening 43, a top surface 44, and a side wall 45 having an orifice 46. The primary opening 43 of the center cylinder 40 is adapted to align with the mid portion of the brush base and the orifice 46 of the side wall 45 is adapted to receive a hose for fluid delivery which, in turn, is connected to a flow regulator. At orifice 46, side wall 45 includes a tapered portion 47 which forms an arm 848 which extends from the ergonomical handle and brush base for connection to the hose/tube.

FIGS. 14a, 14b and 14c illustrate base plates appointed to be attached to the brush base. At least one base plate 701 is provided having grooming implementations integrated therein. FIG. 14a shows a bottom view of the base plate 701 having bristle elements 721; FIG. 14b shows a top view of the base plate 701 with bristle elements 721; FIG. 14c shows a top view of an alternative base plate 750 having a sponge element 751. Each base plate 701, 750 includes a bottom side 702, 752, top side 703, 753, a center opening 704, 754 corresponding in size and shape to the mid portion of the brush base, and grooming implements 705, 755. A secondary base plate aperture 724 is provided which aligns with the secondary aperture of the perimeter shelf portion of the brush base, which in turn is aligned with the lower orifice of the secondary cylinder for delivery of the liquid soap therein.

In FIGS. 14a and 14b the grooming and cleaning implements 705 are shown as bristle elements 721, while in FIG. 14c the grooming implements 705 are shown as a sponge element 751. Base plate 701, 750 is constructed, preferably via injection molding and is appointed to attach onto perimeter shelf portion and/or outer perimeter portion of the brush base by way of snap-on fastening. Alternatively, attachment may be achieved through use of industrial hook and loop fasteners, such as are sold under the trade name Velcro, matingly located on the back of the base plate and on the perimeter shelf portion of the brush base. As shown herein, snap-on tongue receiving members 717, 757 are grooved in base plate 701, 750. These snap-on tongue receiving members 717, 757 are appointed to receive the snap-tongue members of the brush base. Preferably, the snap-on tongue receiving members 717, 757 have a shallow depth 718, 758 corresponding to the depth of the snap-on tongue members of the brush base, having a shallow depth 418 ranging from 0.06 inches up to 0.5 inches, and are dependent upon the thickness of the base plate to be attached. As shown, preferably a plurality of snap-on tongue receiving members 717, 757 are provided, in addition to the plurality of snap-on tongue members provided in the brush base. Although such attachment is illustrated, attachment may be accomplished in any number of currently known means for snap-on components, such as tongue and groove, hook and loop, screw-attachment, and the like. Bristles elements 721 are herein shown having a cone shape, but bristle elements 721 may have an elongated rectangular or cylindrical shape, or any suitable shape for combing between hairs or fur of the coat of an animal. Alternatively, the bristle elements 721 may have a rounded top in order to provide massaging treatment. Moreover, sponge 751 may have varying thicknesses, preferably ranging from 0.5 inches to 3 inches in depth, depending on the needs of the user.

FIGS. 15a, 15b and 15c illustrate another embodiment of base plates appointed to be attached to the brush base. At least one base plate 801 is provided having grooming implementations integrated therein. FIG. 15a shows a bottom view of the base plate 801 having bristle elements 821; FIG. 15b shows a top view of the base plate 801 with bristle elements 821; FIG. 15c shows a top view of an alternative base plate 850 having a sponge element 851. Each base plate 801, 850 includes a bottom side 802, 852, top side 803, 853, a center 804, 854 corresponding in size and shape to the mid portion of the brush base and having a plurality of base plate apertures 823, 873 integrated therein aligned with the apertures of the brush base. Grooming implements 805, 855 are also provided. A secondary base plate aperture 814, 864 is provided which aligns with the secondary aperture of the perimeter shelf portion of the brush base which, in turn, is aligned with the lower orifice of the secondary cylinder for delivery of the liquid soap therein. In FIGS. 15a and 15b the grooming implements 805 are shown as bristle elements 821, while in FIG. 15c the grooming implements 805 are shown as a sponge element 851. These base plates are similarly constructed and applied onto the brush base as previously discussed in the discussion relating to FIGS. 14a-14c, via snap-on fastening. Alternatively, attachment may be achieved through use of industrial hook and loop fasteners, such as are sold under the trade name Velcro, matingly located on the back of the base plate and on the perimeter shelf portion of the brush base. As shown herein, snap-on tongue receiving members 817, 857 are grooved in base plate 801, 850. These snap-on tongue receiving members 817, 857 are appointed to receive in the snap-tongue members of the brush base. Although such attachment is illustrated, attachment may be accomplished in any number of currently known means for snap-on components, such as tongue and groove, hook and loop, screw-attachment, and the like.

The brush assembly disclosed herein can be modified in numerous ways without departing from the scope of the invention. Optionally, the porous sponge can be replaced by a plastic silicon shell having an aperture leading to a soluble formulation such as perfume, fragrance and/or other active compositions.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A direct application brush assembly, comprising:
   a. a molded brush base having an outer perimeter portion, perimeter shelf portion and a mid portion with a plurality of apertures integrated therein for delivery of a fluid, wherein said perimeter shelf portion includes at least one secondary aperture;
   b. at least one base plate having grooming implementations integrated therein being appointed to be received on said molded brush base;

c. an ergonomical handle having a palm conforming top and symmetric finger indentation around front and side walls constructed to form an internal cavity and being attached to said brush base, said ergonomical handle being ambidextrous in nature for interchangeable handedness;

d. a center cylinder being located within said internal cavity of said ergonomical handle and comprising a bladder with a bottom surface, a top surface, and a side wall having an orifice;

e. said orifice of said side wall of said center cylinder being adapted to receive a hose for fluid delivery;

f. a secondary chamber being located within said internal cavity of said ergonomical handle appointed for receiving and holding a liquid solution and comprising a secondary bladder with a lower surface having a lower orifice aligned with said secondary aperture of said perimeter shelf portion, side walls, and a top surface having a release button for release of said liquid solution;

g. a closure member associated with said lower orifice of said second bladder and/or said secondary aperture of said perimeter shelf portion for preventing release of said liquid solution;

h. a flow regulator;

i. said hose having a first end fitted with said flow regulator and a second end fitted to said orifice of said side wall of said center cylinder so that said hose delivers said fluid from said flow regulator into said bladder of said center cylinder;

whereby said flow regulator controls delivery of said fluid into said hose and visa vie said bladder of said center cylinder attached to said brush base, releasing said fluid through said apertures in said mid portion of said brush base; and whereby said release button controls delivery of said liquid solution, releasing said liquid solution through said secondary aperture of said perimeter shelf portion of said brush base.

2. A brush assembly as recited by claim 1, wherein a primary opening of said center cylinder aligns with said mid portion of said brush base in a substantially sealed condition.

3. A brush assembly as recited by claim 1, wherein said mid portion of said brush base having said plurality of apertures integrated therein is constructed of a flexible deformable membrane.

4. A brush assembly as recited by claim 1, wherein said mid portion of said molded brush base includes parallel interior walls adapted to receive a rim of said primary opening of said bottom surface of said center cylinder for substantially sealing said center cylinder to said brush base for said fluid delivery through said plurality of apertures integrated within said mid portion of said brush base.

5. A brush assembly as recited by claim 1, wherein a plurality of different base plates are provided, and said base plates have various grooming implementations integrated therein.

6. A brush assembly as recited by claim 1, wherein said grooming implementation of said base plate is a sponge that forms a sponge base plate.

7. A brush assembly as recited by claim 1, wherein said grooming implementation of said base plate is a plurality of teeth that form a massaging plate appointed for scrubbing and massaging said animal.

8. A brush assembly as recited by claim 7, wherein each of said teeth comprises a circular cross section having a central channel with an aperture along a length of said bristle appointed for further delivery of said fluid through said teeth.

9. A brush assembly as recited by claim 1, wherein said ergonomical handle includes non-slip means.

10. A brush assembly as recited by claim 9, wherein said palm conforming top of said ergonomical handle includes texture to mitigate slippage during use.

11. A brush assembly as recited by claim 9, wherein said finger indentation sides of said ergonomical handle include texture to mitigate slippage during use.

12. A brush assembly as recited by claim 1, wherein said brush assembly is composed of a polymeric material to provide a durable lightweight brush assembly.

13. A brush assembly as recited by claim 1, wherein said ergonomical handle includes a padded cushion material integrated therein for comfort.

14. A brush assembly as recited by claim 13, wherein said palm conforming top of said ergonomical handle includes a padded material integrated therein.

15. A brush assembly as recited by claim 1, wherein said fluid is water.

16. A brush assembly as recited by claim 1 comprising a mixing chamber housing a compound appointed to be mixed with water delivered from said flow regulator to form a liquid solution that is appointed to be fed through said hose into said bladder of said center cylinder and fed through said apertures of said mid portion of said brush base for dissemination.

17. A brush assembly as recited by claim 1, wherein said liquid solution includes active ingredients comprising grooming and cleaning products for a coat of an animal.

18. A brush assembly as recited by claim 1, wherein said liquid solution includes active ingredients comprising animal health care products.

19. A brush assembly as recited by claim 1, wherein said liquid solution includes perfume, fragrance and/or other active composition comprising insect repellant, flea repellants and treatments, tic repellant, mane and tail hair conditioning compositions, dye compositions, moisturizing ingredients, or antibacterial compounds.

20. A brush assembly as recited by claim 1, wherein said liquid solution consists of active ingredients selected from a group consisting of insect repellants, flea and/or tic compounds, muscle treatments, therapeutic or moisturizing compounds, or antibacterial compounds.

21. A brush assembly as recited by claim 1, wherein said liquid solution consists of active ingredients selected from a group consisting of perfumes, fragrance, hair-conditioning and detangle products, sun protection lotions, mane and tail whiteners and stain removers, dye compositions, fragrances or other hair/fur/coat-care related products.

22. A brush assembly as recited by claim 1, wherein said secondary cylinder is disposable and replacement secondary cylinders are available.

23. A brush assembly as recited by claim 1, wherein said base plate is disposable.

24. A brush assembly as recited by claim 1, wherein said ergonomical handle has a diameter of 4 inches, length of 5 inches and height of 2 inches.

25. A brush assembly as recited by claim 1, wherein said base plate includes a plurality of base plate apertures aligning with said plurality of apertures of said brush base and at least one secondary plate aperture aligning with said secondary aperture of said brush base.

26. A brush assembly as recited by claim 1, wherein said base plate includes a major opening encompassing said plurality of apertures of said brush base and at least one secondary plate aperture aligning with said secondary aperture of said brush base.

27. A brush assembly as recited by claim 1, wherein said release button of said secondary bladder is a pneumatic release button, wherein said release button is composed of a flexible deformable membrane and pressing said release button causes pressure within said secondary bladder and release of said liquid solution through said lower orifice.

28. A brush assembly as recited by claim 1, wherein said closure member is a rotating slide closure member.

29. A brush assembly as recited by claim 28, wherein said closure member is shaped having an arced portion and stem having a stem aperture, wherein said arced portion traverses said brush base in a sliding semi-rotating fashion, moving said stem portion to and fro in relation to said lower orifice of the secondary cylinder.

30. A brush assembly as recited by claim 1 comprising a tab in communication with said closure member for moving said closure member into open and closed positions.

31. A brush assembly as recited by claim 1, wherein said base plate has a plurality of base plate apertures and at least one of said base secondary apertures is adapted to align with said one of said apertures of said molded brush base.

32. A method for making a direct delivery brush assembly that releases a fluid, comprising the steps of:
 a. forming a brush base having an outer perimeter portion, perimeter shelf portion and a mid portion with a plurality of apertures integrated therein for delivery of a fluid;
 b. forming at least one base plate having grooming implementations that are integrated therein and are received on said molded brush base;
 c. forming a center cylinder comprising a bladder with a bottom surface, a top surface, and a side wall having an orifice;
 d. forming a secondary cylinder appointed to receive and hold a liquid solution and comprising a secondary bladder with a lower surface having a lower orifice, side walls, and a top surface having a release button in communication with said lower orifice;
 e. forming a closure member associated with said lower orifice of said second bladder and/or said secondary aperture of said perimeter shelf portion for preventing release of said liquid solution;
 f. aligning said lower orifice of said secondary cylinder with said secondary aperture of said perimeter shelf portion and placing it upon said brush base;
 g. forming an ergonomical handle having a palm conforming top and finger indentation sides constructed to form an internal cavity, said ergonomical handle being ambidextrous in nature for interchangeable handedness;
 h. attaching said ergonomical handle to said outer perimeter portion of said brush base so that said center cylinder and said secondary cylinder are located within said internal cavity;
 i. connecting a second end of a hose to said orifice of said side wall of said center cylinder;
 j. connecting a first end of said hose to a flow regulator for delivery of said fluid into said bladder of said center cylinder;
 whereby said flow regulator controls delivery of said fluid into said hose and said bladder of said center cylinder attached to said brush base, releasing said fluid through said apertures in said mid portion of said brush base; and
 whereby said release button controls delivery of said liquid solution, releasing said liquid solution through said secondary aperture of said perimeter shelf portion of said brush base.

\* \* \* \* \*